United States Patent
Pfeffer et al.

(10) Patent No.: US 10,205,628 B2
(45) Date of Patent: Feb. 12, 2019

(54) METHODS AND APPARATUS FOR DETERMINING AND/OR CONTROLLING BACKUP POWER IN A COMMUNICATIONS SYSTEM

(71) Applicant: Time Warner Cable Enterprises LLC, St. Louis, MO (US)

(72) Inventors: Howard Pfeffer, Reston, VA (US); Peter H Wolff, Bradenton, FL (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 14 days.

(21) Appl. No.: 15/176,058

(22) Filed: Jun. 7, 2016

(65) Prior Publication Data
US 2017/0353346 A1  Dec. 7, 2017

(51) Int. Cl.
*H04L 12/24* (2006.01)
*H04L 12/10* (2006.01)
*H04L 12/26* (2006.01)
*H02J 9/00* (2006.01)
*H02J 9/06* (2006.01)

(52) U.S. Cl.
CPC ............ *H04L 41/065* (2013.01); *H04L 12/10* (2013.01); *H04L 41/12* (2013.01); *H04L 43/0817* (2013.01); *H02J 9/061* (2013.01)

(58) Field of Classification Search
CPC ... H04L 41/065; H04L 12/10; H04L 41/0677; H02J 9/061
See application file for complete search history.

(56) References Cited

U.S. PATENT DOCUMENTS

| | | | | |
|---|---|---|---|---|
| 5,129,085 | A | * | 7/1992 | Yamasaki ................. G06F 9/52 711/153 |
| 5,568,399 | A | * | 10/1996 | Sumic .................. G01R 31/086 700/293 |
| 9,689,710 | B2 | * | 6/2017 | Vaswani .................. G01D 4/02 |
| 9,881,470 | B2 | * | 1/2018 | Baynes .................. G05B 15/02 |
| 2003/0051176 | A1 | * | 3/2003 | Heberlein, Jr. ........... H02J 9/06 713/300 |
| 2013/0257623 | A1 | * | 10/2013 | Bagasra ............... G08B 27/005 340/657 |
| 2013/0326059 | A1 | * | 12/2013 | Gourlay .................. H04L 43/04 709/224 |

(Continued)

*Primary Examiner* — Uzma Alam
(74) *Attorney, Agent, or Firm* — Straub & Straub; Michael P. Straub; Stephen T. Straub

(57) ABSTRACT

Methods and apparatus for detecting whether network nodes and CPE devices serviced by the network nodes are in the same region of a utility power grid are described. Methods and apparatus for using the result of the determination to control, e.g., automatically, backup power resource allocation are also described. Transforming the information collected from CPE devices and other devices into images which are displayed, e.g, as maps, is also described. An automatic determination of whether a network node is in the same power grid region as one or more groups of CPE devices to which the network node provides service. If a network node and a group of CPE devices serviced by the network node are in different utility power regions, backup power devices are automatically deployed to support service to CPE devices during an external power outage at the network node.

19 Claims, 14 Drawing Sheets

(56) References Cited

U.S. PATENT DOCUMENTS

2016/0020997 A1* 1/2016 Hui ........................ H04B 1/713
 370/225
2016/0149805 A1* 5/2016 Hui ........................ H04L 45/28
 370/389

* cited by examiner

METHODS AND APPARATUS FOR DETERMINING AND/OR CONTROLLING BACKUP POWER IN A COMMUNICATIONS SYSTEM

FIELD

The present application relates to backup power, and more particularity, to evaluating network power mapping to communications network service areas and/or allocating limited backup power resources to network nodes in a communications system in which a network node and customer premises equipment (CPE) devices may experience external network power outages at different times.

BACKGROUND

A CATV (cable TV) system includes a communications network which provides service to customers. Elements in the CATV system receive power from a power service provider, e.g., power company. Such power is often supplied by a power network sometimes referred to as the power grid. The operator of the commercial power grid is normally a different company from the CATV company which controls nodes of the CATV system and which is responsible for providing communications services to customers located at various customer premises. The CATV system is often divided into regions or service areas for purposes of providing communications services. For communications purposes, a CATV company often divides up an area into what are sometimes referred to as service groups. A small network node, such a hub site, may provide services to customer premises arranged into one or a few service groups. Each service group normally corresponds to a small local area near the hub site providing service for the service group.

A network headend, e.g., a central office which provides content and services to multiple hubsites is normally equipped with backup generators. However small network nodes such as hubsites may or may not be supplied with backup power and in some cases a network node maybe supplied with backup power for one but not necessarily all service groups supported by the network node.

A power company often divides up geographic areas into regions for power supply purposes. However, the power grid maybe and often is configured independently and differently from the communications network. Thus the way the power company divides up the power grid into regions for purposes of supplying power is normally independent of, and different from, how the CATV company divides up a region for purposes of supplying service to customer premises and where the CATV company deploys network nodes. Furthermore, the division of the communications network and power grid may change over time as each company independently modifies its system. As a result, nodes in a communications network responsible for providing services to customer premises may end up in a different region of a power grid than the customer premises (CPE) devices to which communications services are provided.

Optical or other nodes in the CATV network and/or other communications network are used to convert optical signaling to radio frequency (RF) signals and RF amplifies are used to amplify the RF signals to make up for the loss experience as these signals pass through coaxial cables to a subscribers home. The coaxial cable network extends inside a subscriber's home to modulator-demodulator devices that convert the RF signals to Ethernet communication or set top box equipment used to convert the RF signals to another format like HDMI to be connected to the subscriber's television set.

All these active devices in the CATV network and in the home require energy generally in the form of AC power from the public utility, e.g. power company. The network devices such as optical nodes and amplifiers typically require conditioned power from standby and non-standby ferroresonant power supplies that derive their power form the public utility. These power supplies are typically rated at 1000 to 2000 VA. The ferroresonat design achieves very high reliability, generally with mean-time-between failures (MTBF) in excess of 250,000 hours of 28 years. The simplicity of the design, the avoidance of silicon in the direct power path, and the inherent lighting and short circuit protection enable the reliability performance despite the harsh outside operating environment.

The supply in the buffer between the power utility and HFC components, regulating and grooming the AC output of active system devices. A typical supply will have stand-by capability, which provides system power in the event of a power utility outage. This is done using batteries and an inverter module to convert DC to AC for the system component, Stand-by supplies typically provide up to 90 minutes of power to the system, depending on the amperage draw from system components, and the state of battery charge, at the time of inversion or outage. Typical HFC power supplies deliver 87.5 VAC output@15 amperes to the HFC system. The supplies typically require 110-120 VAC input form the low power company/utility.

Some power supplies are configured with a transponder that communicates with a Network Operation Center (NOC) when a power outage occurs. Power outages inducing an inversion event may or may not signal an alarm because not all power supplies contain a transponder or method of communicating telemetry with the NOC.

With the advent of SmartGrid technology used by the power utility companies, circuit faults are generally not widespread outages but more isolated events that are dynamically configured. This technology may isolate a CATV customer's home from the CATV optical node such that an inversion event is activated at the node without the customer's home being affected or vice versa. The case where a customer's home is not affected by a utility outage and a node supply is not backed up will cause and interruption in CATV services to the customer's home.

In the case where a network node is in the same power supply, e.g., utility grid, region, both the network node and CPE devices are likely to suffer power outages at the same time. The effect of failing to provide backup power at the network node in such cases, or providing backup power for a short duration corresponding to the expected backup battery power duration of CPE devices, is likely to be an efficient way of allocation resources since customers in a region without power are not likely to notice if the network node providing them service is unavailable due to power loss since the CPE devices will suffer from the same power loss.

However, when a network node providing services to CPE devices is in a different power supply, e.g., power grid, region than the CPE devices, then backing up of the network node for all or an extended period of time during which a power outage at the network node occurs maybe effective in maintaining service to CPE devices which, being in another portion of the power grid, may remain powered during a period of time in which the network node loses external power due to a power grid outage.

Unfortunately, power companies often do not share detailed power grid information and/or the available information is not completely accurate. Accordingly, to facilitate power management and deployment of backup power resources, there is a need for methods and/or apparatus which would allow a communications system to automatically detect whether network nodes and the CPE devices serviced by the network nodes are in the same or different power supply, e.g., power grid, regions. There is also a need for methods and apparatus for converting collected information about the relationship between power supply, e.g., power grid, regions, network node locations, and locations of CPE devices serviced by network nodes into information and/or images which can be easily understood by communications network managers and used in making backup power allocations. In addition there is a need for methods and/or apparatus for automatically control the deployment and/or allocation of backup power resources based on collected or generated information indicating the relationship between power supply religions, network nodes and/or CPE devices which are provided service by a network node.

SUMMARY

Exemplary methods and apparatus related to backup power in a communication network which received power from an power system, e.g., commercial power grid provided by a power utility company, are described. Various described methods and apparatus are well suited for use in a communications network, e.g., a CATV network, fiber network or other type of network, in which a network node and a group of customer premises equipment (CPE) devices being serviced by the network node may be located in different power grid regions. The power grid regions may be controlled by an entity independent of the communications network, e.g., a power utility company, which may change their power grid regions over time at their discretion, and the communications network may be initially unaware of the network node and CPE device mapping with regard to the currently implemented power grid regions. A network node located in a different power grid region than a CPE device may experience power outages at different times.

In some embodiments, a device, e.g., a backup power controller, collects and evaluates, e.g., statistically evaluates, information in response to a detected network node power outage to determine whether a group of CPE devices, being service by the network node, is predominately or entirely in the same or a different power grid region as the power grid region in which the network node is located. Exemplary collected information used in the determination includes network node power outage duration and CPE device polling response information, e.g., CPE device uptime values, following the end of a detected network node power outage. The collected information is then processed and transformed into a useful image which can be used in management of backup power in the communications system and/or used to automatically control the allocation and/or deployment of backup power resource, e.g., battery backup power supplies and/or generators in the network.

The device, e.g., the backup power controller, uses the collected information corresponding to the detected network node outage to generate a power system and network node map indicating power system regions, network node regions, e.g., service group regions of the network node, and locations of network nodes, said power system and network node map providing a visual representation indicating whether a network node is in the same power grid region or a different power grid region as a group of CPE devices service by the network node. Thus by transforming the collected information into a useful result, e.g., maps and/or images which are stored, transmitted and/or used to automatically control resources, e.g., backup power resources, in the communications network, the technical problem of how to generate information useful to backup power allocation decisions and how to effectively allocate backup power resources in a communications system to improve communications reliability is addressed. The device, e.g., the backup power controller evaluates power mapping and allocates, e.g., automatically allocates, backup power resources, e.g., limited backup power resources, to network nodes in the communications network in an efficient manner, e.g., making network node backup power allocation decisions between competing network nodes and/or competing service groups of a network node.

Various embodiments are directed to methods and apparatus that enhance customer service in a hardware efficient manner making efficient, and sometimes automatic, allocations of backup power hardware and/or resources based on the collected and transformed information.

An exemplary method of operating a device, e.g., a power controller, in a communications network including a first network node, in some embodiments, includes: detecting a network node power outage at the first network node; detecting an end of network node power outage at the first network node; polling a first group of customer premises equipment (CPE) devices which obtain service from the first network node at the end of the detected power outage; and determining based on information returned from the polling if the CPE devices in the first group correspond to the same power region as the first network node.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 2 comprises the combination of FIG. 2A, FIG. 2B, FIG. 2C and FIG. 2D.

DETAILED DESCRIPTION

Figure 1:
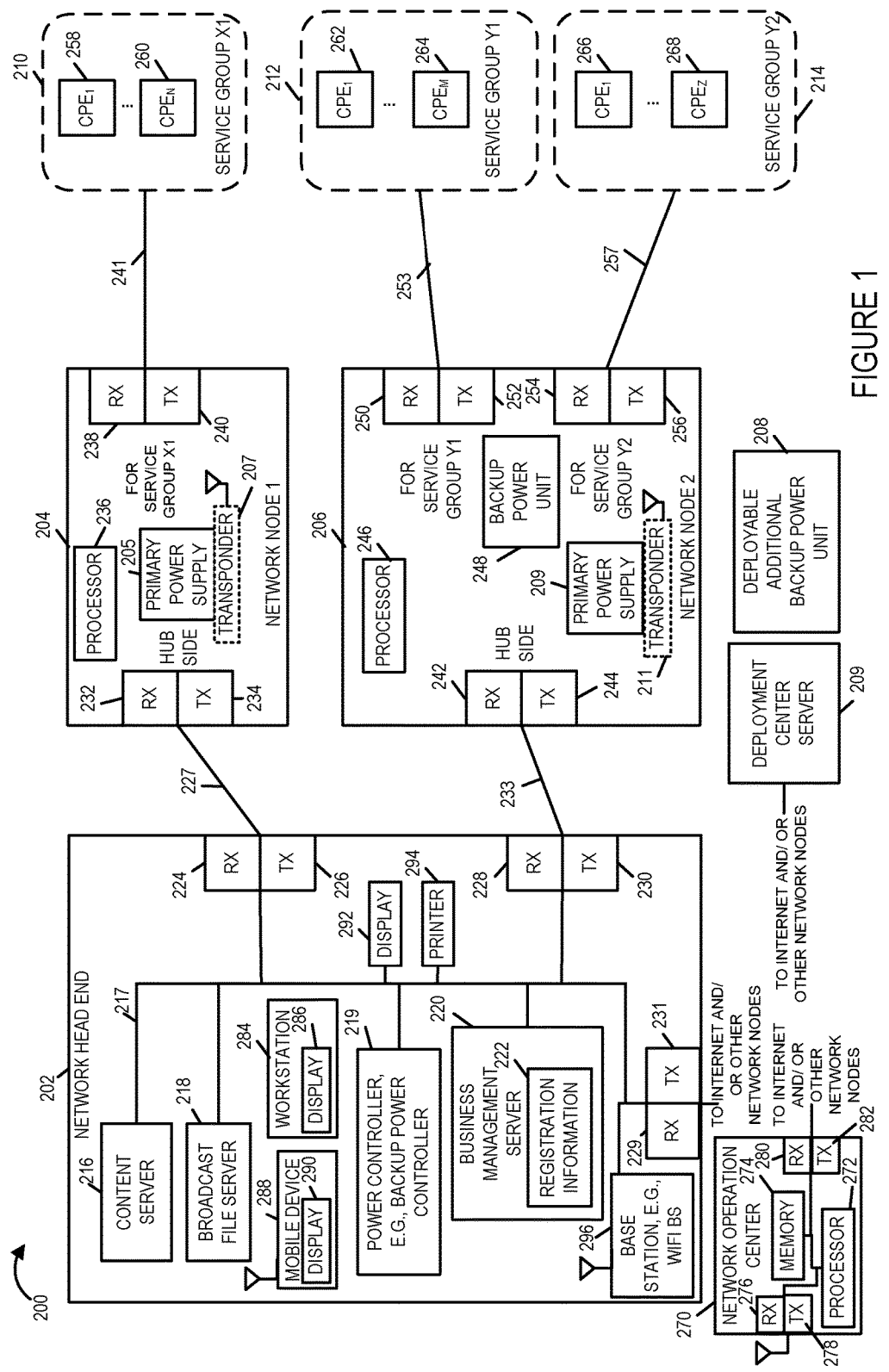
FIG. 1 is a drawing of an exemplary communications system, e.g., a communications network, including a power controller, e.g., a backup power controller, in accordance with an exemplary embodiment.
Figure 2D:
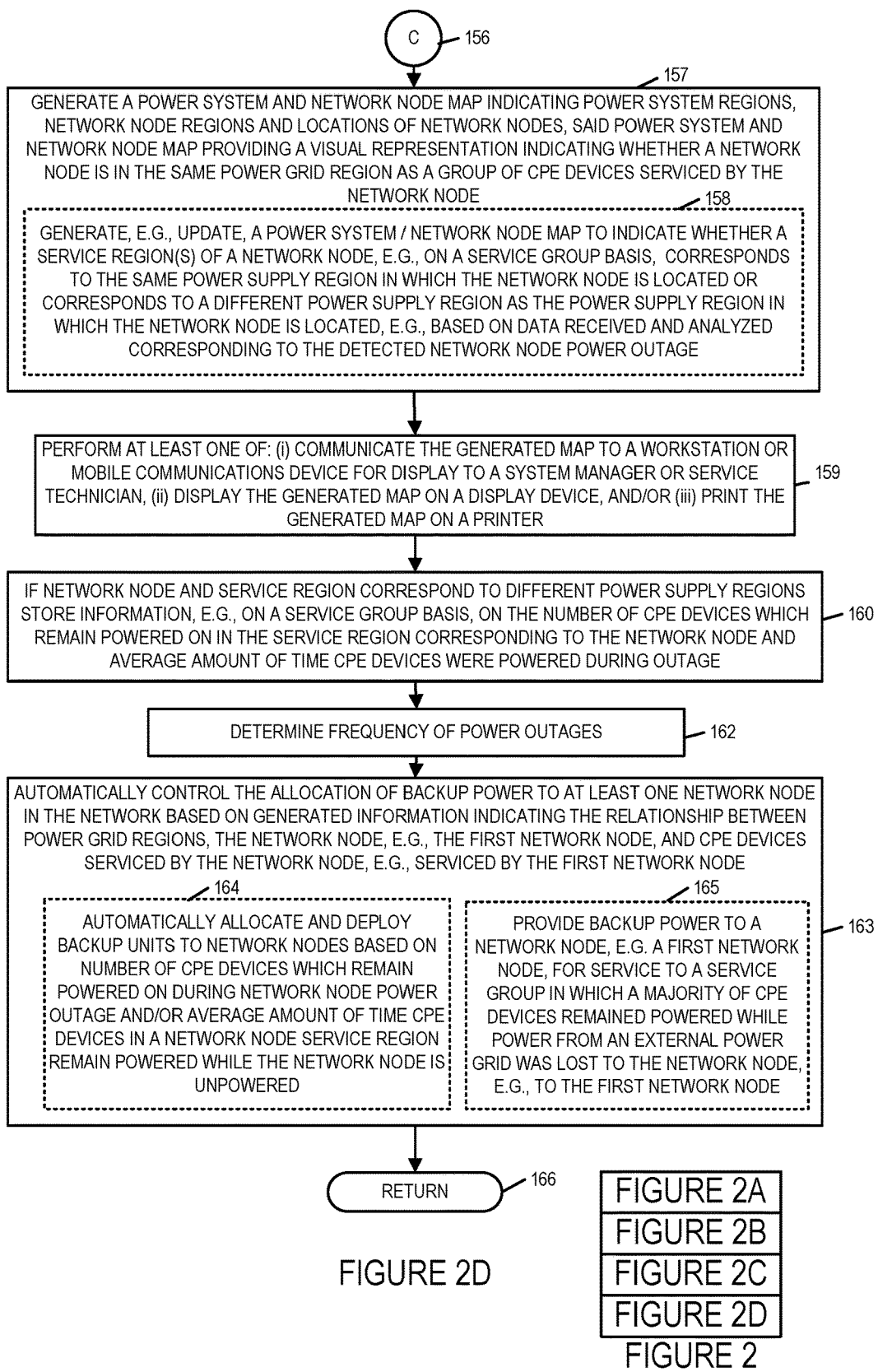
FIG. 2D is a fourth part of a flowchart of an exemplary method of operating a power controller, e.g., a backup power controller, in accordance with an exemplary embodiment.
Figure 2A:
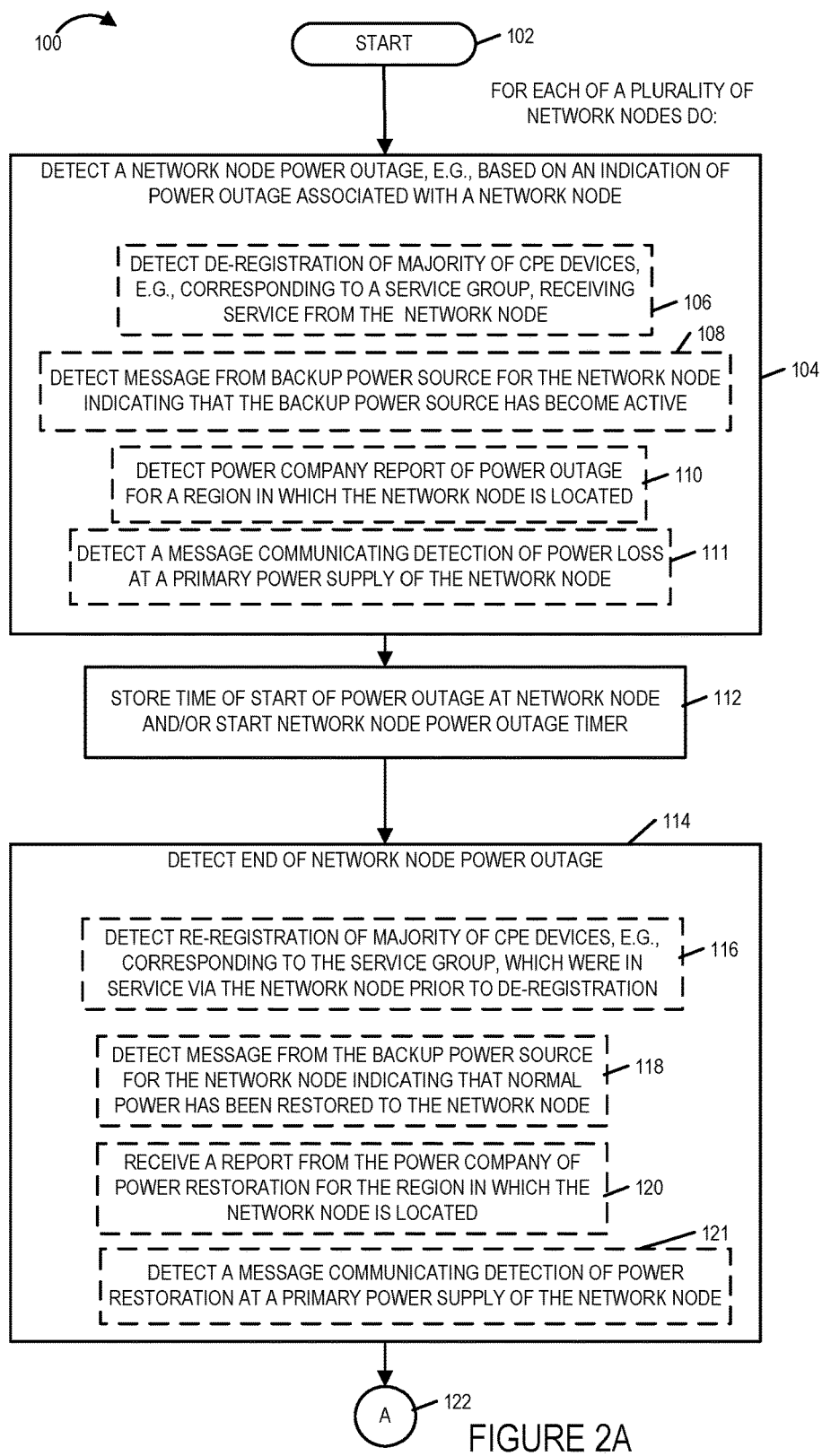
FIG. 2A is a first part of a flowchart of an exemplary method of operating a power controller, e.g., a backup power controller, in accordance with an exemplary embodiment.
Figure 2B:
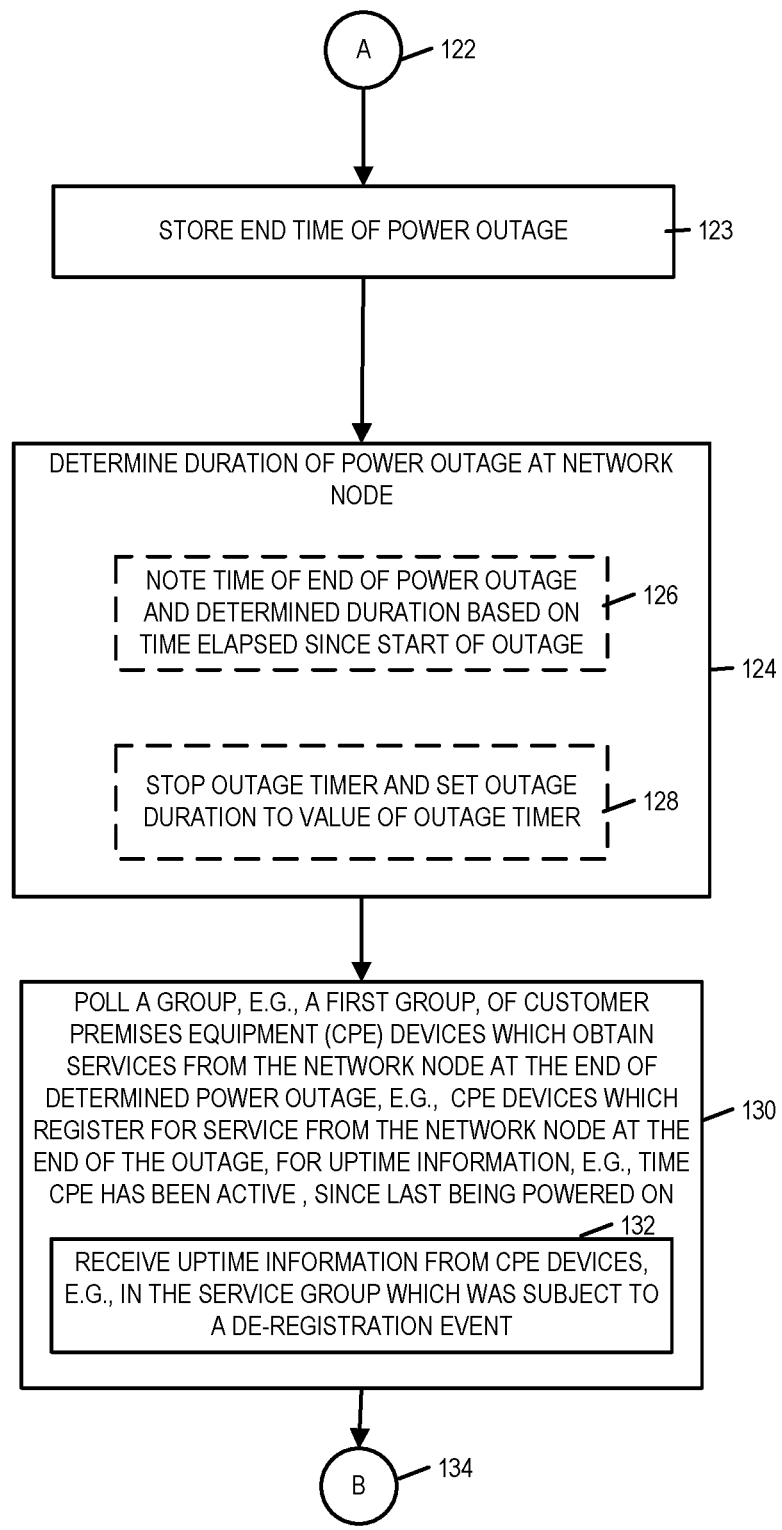
FIG. 2B is a second part of a flowchart of an exemplary method of operating a power controller, e.g., a backup power controller, in accordance with an exemplary embodiment.
Figure 2C:
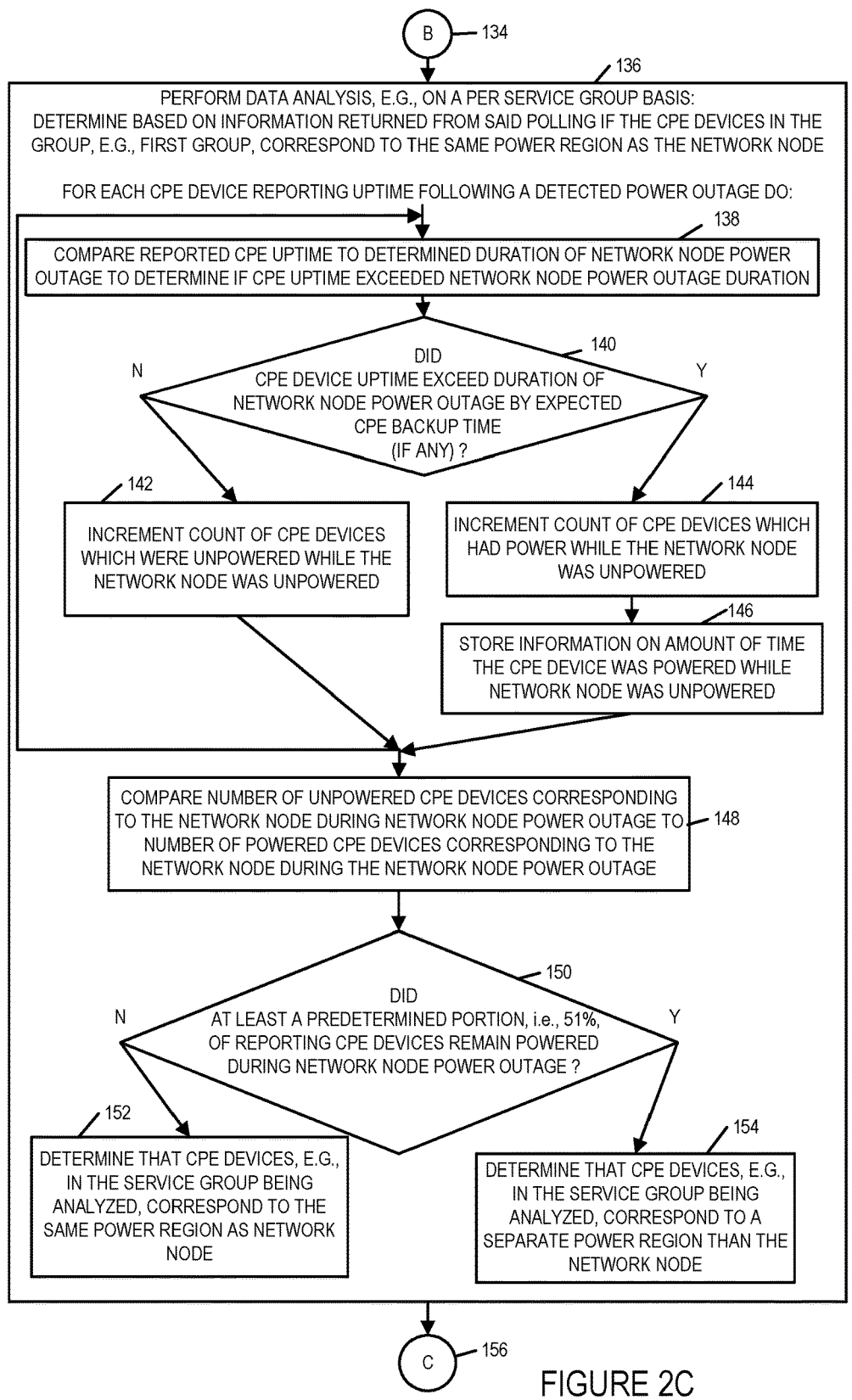
FIG. 2C is a third part of a flowchart of an exemplary method of operating a power controller, e.g., a backup power controller, in accordance with an exemplary embodiment.

FIG. 1 is a drawing of an exemplary communications system 200 including a power controller 219, e.g., a backup power controller, in accordance with an exemplary embodiment. Exemplary system 200 includes a network head end 202, a plurality of network nodes (network node 1 204, network node 2 206), and a plurality of service groups (service group X1 210, service group Y1 212, service group Y2 214) coupled together as shown in FIG. 1.

Network head end 202 includes a content server 216, a broadcast file server 218, a power controller 219, e.g., a backup power controller, a business management server 222 including registration information 222, and a plurality of receiver transmitter pairs ((receiver 224, transmitter 226), (receiver 228, transmitter 230), (receiver 229, transmitter 231)) coupled together via a bus 217 over which the various elements may interchange data and information. Content server 216 supplies content, e.g. user requested stored programs, to network nodes (204, 206) to be delivered to CPE devices, e.g., in response to a user request. Broadcast file server 218, broadcasts schedules programs to network nodes (204, 206) to be available to be delivered to CPEs devices. Business management server 220 performs business related operations including registration, de-registration, and re-registration operations for CPEs.

Power controller 219, e.g., a backup power controller, implements the method of flowchart 100 of FIG. 2. Backup power controller 219 manages the deployment of backup power in system 100 with regard to the network nodes (204, 206), e.g., making backup power deployment decisions based on analyzed data. Backup power controller 219 determines power region mapping information with regard to network nodes and with regard to service regions of network nodes. Backup power controller 219 performs evaluations, e.g., statistical evaluations, based on information collected corresponding to detected power outages, e.g., of network nodes. In some embodiments, backup power controller 219 monitors registration, re-registration, and de-registration signaling flowing between the business management server 220 and CPEs. In some embodiments, backup power controller 219 determines a power outage interval duration for a network node and determines whether or not a CPE in a service group of the network node also experienced the power outage, and if so, the outage duration at the CPE. In some embodiments, following a network node power outage the backup power controller 219 polls CPEs to obtain uptime information. In various embodiments, the backup power controller 219 identifies a number and/or percentages of CPEs in a service group which are in the same power region as the power region in which the network node is located and identifies a number and/or percentages of CPEs in a service group which are in a different power region as the power region in which the network node is located. In some embodiments, a service group may correspond to multiple power regions and the backup power controller identifies the power region with which the largest percentage of CPEs in the service group is associated. In various embodiments, the backup power controller determines backup power capabilities of CPEs.

Backup power controller 219 makes backup power allocation decisions based on its analysis, e.g., selecting a network node and a service group of the network node for which backup power is to be made available, from among a plurality of alternatives. In various embodiments, backup power controller 219 performs operations to attempt to optimize the limited available backup power resources such as to keep the greatest number of CPEs in system 100 operational in the event of power failures based on previous power failure information. Backup power controller 219 is responsive to power company system infrastructure changes, e.g., resulting in different power regions, which may not be reported to the communications system. Thus backup power controller 219 detects changes in power mapping as network node power failures occur and readjusts the mapping of network nodes and service regions to power regions, and is responsive to such identified changes, e.g., changing deployment of backup power automatically.

Receiver 224 receives signals from transmitter TX 234 of network node 1 204. Received signals received by RX 224 include, e.g., a program request signal, a registration message, a de-registration message, a re-registration message, a back-up power source message indicating activation, a back-up power source message indicating normal power restoration, and a message including uptime information from a CPE device which was polled. Transmitter 226 transmits signals to receiver 232 of network node 1 204. Exemplary signals transmitted by transmitter 226 include, e.g., program content signals, a registration message, a de-registration message, a re-registration message, etc. Receiver 228 receives signals from transmitter TX 244 of network node 2 206. Received signals received by RX 228 include, e.g., a program request signal, a registration message, a de-registration message, a re-registration message, a back-up power source message indicating activation, a back-up power source message indicating normal power restoration, and a message including uptime information from a CPE device which was polled. Transmitter 230 transmits signals to receiver 242 of network node 2 206. Exemplary signals transmitted by transmitter 228 include, e.g., program content signals, a registration message, a de-registration message, a re-registration message, a command to switch a backup power source, e.g., to changing the allocation of backup power unit to supporting communications with a second service group instead of a first service group, e.g., commanding a re-configuration with regard to backup power unit 248. Receiver 229 receives signals from the Internet and/or other network nodes, e.g., deployment center server 209. An exemplary signal received by RX 229 is, e.g., a power company report of a power outage for a region in which one of network nodes 204, 206 is located, or a power company report of restoration of power for a region in which one of network nodes 204, 206 is located. Transmitter 231 transmits signals to the Internet and/or other network node, e.g., deployment center server 209. An exemplary transmitted signal via TX 231 is a backup power deployment command message to deployment center server 209.

Network node 1 204 includes a primary power supply 205, a processor 236, a hub side receiver transmitter pair (receiver 232, transmitter 234) and a service group receiver transmitter pair (receiver 238, transmitter 240). Network node 1 204 is an intermediary device between head end 202 and CPEs (258, 260) of service group X1 210. RX 238 receives signals from CPEs (258, . . . , 260). TX 240 sends signal to CPEs (258, . . . , 260). In this example, network node 1 204 does not initially include a backup power source, but an additional back power sources, e.g. deployable additional backup power source 208 may be, and sometimes is, deployed in network node 1 204, e.g., in response to an evaluation and deployment decision by backup power controller 219. In some embodiments, network node 1 204 further includes a transponder 207 coupled to the primary power supply.

Network node 2 206 includes a primary power supply 209, a processor 246, a hub side receiver transmitter pair (receiver 242, transmitter 244), a backup power unit 248, and a first service group receiver transmitter pair (receiver 250, transmitter 252), and a second service group receiver transmitter pair (receiver 254, transmitter 256). RX 250 receives signals from CPEs (262, . . . , 264). TX 252 sends signal to CPEs (262, . . . , 264). RX 254 receives signals from CPEs (266, . . . , 268). TX 256 sends signals to CPEs (266, . . . , 268). Network node 2 206 is an intermediary device between head end 202 and CPEs (262, . . . , 264) of service group Y1 212 as well as CPEs (266, . . . , 268) of service group Y2 214. In some embodiments, network node 2 206 further includes a transponder 211 coupled to primary power supply 209.

Service group X1 210 includes a plurality of CPE devices (CPE 1 258, . . . , CPEN 260). Service group Y1 212 includes a plurality of CPE devices (CPE 1 262, . . . , CPEM 264). Service group Y2 214 includes a plurality of CPE devices (CPE 1 266, . . . , CPEZ 268).

Network head end 202 is coupled to network node 1 204 via link 227. Network head end 202 is coupled to network node 2 206 via link 233.

Network node 1 204 is coupled to service group X1 210 via link 241. Network node 2 206 is coupled to service group Y1 212 via link 253. Network node 2 206 is coupled to service group Y2 212 via link 257.

Exemplary system 200 further includes a deployment center server 209 and a deployable additional backup power unit 208. Although one deployable addition backup power unit is shown, in some embodiments, there are a wide range of alternative backup power units. Deployment center server 209 may, and sometimes does, receive messages, e.g., from backup power controller 219, commanding deployment of a backup power unit, e.g., deployable additional backup power unit 208, to provide backup power at a specified network node. In some embodiments, the command message includes information identifying a particular service group among a plurality of alternative service groups for which backup power is to be provided, e.g., to support communications between the network node and the CPEs of the selected service group in the event that primary power is lost at the network node. In various embodiments, the deployable power supply 208, may, and sometimes does includes capability to power up commonly used devices within the network node, e.g., a processor and a hub side receiver transmitter pair, and one selected service group interface, e.g., including a receiver transmitter pair corresponding to the selected service group. In some embodiments, the deployment message further specifies whether or not the deployable additional backup power unit is to supply power for the commonly used elements in the network node or for just the selected service group unique components in the network node. For example, some network nodes may already include backup power for the common components, while other network nodes may initially include no backup power. In various embodiments, the deployment message further includes information on the amount of backup power to be supplied by the deployable additional power supply, e.g., in terms of time duration, wattage, energy, etc. In some embodiments, the deployment message further selects a type of deployable additional backup power unit, e.g., a unit which generates electricity from a battery pack, a unit including solar cells and a battery, a unit which generates electricity from the combustion of natural gas, a unit which generates electricity from the combustion of gasoline, or a unit which generates electricity from the combustion of diesel fuel.

Exemplary system 200 further includes a network operation center (NOC) 270. The network operations center 270 includes a processor 272, a memory 274, a first receiver 276, e.g., a wireless receiver, a second receiver 278, e.g., a wireless transmitter, a second receiver 280, and a second transmitter 282, coupled together via a bus 284 over which the various elements may interchange data and information. RX 276 and TX 278 may communicate with transponder 207 and/or transponder 211. For example, in response to a power outage detected at primary power supply 209, transponder 211 generates and sends a power outage message to the network operation center 270, which is received by RX 276. The received power output message is processed by processor 272 and a power outage message is generated and sent via transmitter 282 to the power controller 219 of the network head end, via receiver 229 and bus 217. In some embodiments, when primary power supply 209 recognizes that power has been resorted, e.g., the power outage is over, the transponder 211 sends a power restoration message to network operation center and the information is forwarded to the power controller 219.

Exemplary system 200 further includes a workstation 284 including a display 286, a mobile device 288 including a display 290, a display 292, e.g., a large screen display, a printer 294, and a base station 296, e.g., a WiFi base station 296. The workstation 284, display 292, printer 294, and base station 296 are coupled to bus 217, via which the devices may communicate with other devices. A generated map, e.g., a power system and network node generated map, may be, and sometimes is, communicated to one or more or all of: workstation 284, mobile device 288, display 292 and/or printer 294. One or more or all of displays (286, 290, and 292) may, and sometimes do, display the generated map, e.g., for display to a system manager or service technician.

FIG. 2, comprising the combination of FIG. 2A, FIG. 2B, FIG. 2C and FIG. 2D, is a flowchart 100 of exemplary method of operating a device, e.g., a power controller, in a communications network. The exemplary method of flowchart 100 is a method of operating a device, e.g., a power controller to: detect network node power outage information in a communications network, poll CPE devices, and determine power region information, and/or allocating backup power to a network node in accordance with an exemplary embodiment. In some embodiments, the exemplary method of flowchart 100 is performed by a backup power controller, e.g., backup power controller 219 of FIG. 1. Operation starts in step 102 in which the backup power controller is powered on and initialized. Operation proceeds from start step 102 to step 104, which is performed for each of a plurality of network nodes.

In step 104 the backup power controller detects a network node power outage, e.g., based on an indication of power outage associated with a network node. Step 104 includes one or more or all of step 106, 108, 110 and 111. In some embodiments, different ones or steps 106, 108, 110, and 111 may be, and sometimes are, performed corresponding to different network nodes and/or at different times. In step 106 the backup power controller detects de-registration of a majority of CPE devices, e.g., corresponding to a service group, receiving service from the network node. A CPE device is, e.g. a cable modems or video set top box (STB). In step the backup power controller detects 108 a message from a backup power source for the network node, said detected message indicating that the backup power source has become active. In step 110, the backup power controller detects a power company report of power outage for a region in which the network node is located. In step 111 the backup power controller detects a message communicating the detection of power loss at a primary power supply of the network node.

Operation proceeds from step 104 to step 112. In step 112 the backup power controller stores the time of start of the power outage at the network node and/or the backup power controller starts a network node power outage timer. Operation proceeds from step 112 to step 114.

In step 114 the backup power controller detects an end of the network node power outage. Step 114 includes one or more or all of steps 116, 118, 120 and 121. Different one of steps 116, 118 and 120 may be, and sometimes are, performed corresponding to different network nodes and/or at different times. In step 116 the backup power controller detects re-registration of a majority of CPE device, e.g., corresponding to the service group, which were in service via the network node prior to de-registration. In step 118 the backup power controller detects a message from the backup power source for the network node indicating that normal power has been restored to the network node. In step 120 the backup power controller receives a report from the power company indicating restoration of power for the region in which the network node is located. In step 121 the backup power controller detects a message communicating the detection of power restoration at a primary power supply of the network node. Operation proceeds from step 114, via connecting node A 122, to step 123.

In step 123 the backup power controller stores the end time of power outage. Operation proceeds from step 123 to step 124.

In step 124 the backup power controller determines the duration of power outage at the network node. Step 124 includes one or both of steps 126 and 128. In step 126 the backup power controller notes the time of the end of the power outage and determined duration of the power outage based on elapsed time since the start of the outage. In step 128 the backup power controller stops the outage time and sets the outage duration to the value of the outage timer. Operation proceeds from step 124 to step 130.

In step 130 the backup power controller polls group, e.g., a first group, of customer premises equipment (CPE) devices which obtain services from the network node at the end of the determined power outage, CPE devices which register for service from the network node at the end of the outage, for uptime information, e.g., time CPE has been active, since last being powered on. Step 130 includes step 132 in which the backup power controller receives uptime information from the CPE devices, in the service group which was subject to a de-registration event. The information received in step 132 is returned from polling and includes information indicating how long individual CPE devices in a group, e.g., in a first group, have remained on.

Operation proceeds from step 130, via connecting node B 134, to step 136. In step 136 the backup power controller performs data analysis, e.g., on a per service group basis. In step 136 the backup power controller determines based on information returned from said polling if the CPE device in the group, e.g., the first group, corresponds to the same power region as the network node. For each CPE device reporting uptime following a detected power outage, step 138, step 140, and step 142 or steps 144 and 146 are performed. In step 138 the backup power controller compares reported CPE uptime to determined duration of the network node power outage to determine if CPE uptime exceeded network node power outage duration. Operation proceeds from step 138 to 140. In step 140, the backup power controller determines if CPE device uptime exceeds the duration of the power outage at the network node, e.g. first network node, by an amount which exceeds an expected backup time for CPE devices in the group, e.g., first group, of CPE devices. In some embodiments, the expected backup time for CPE devices in the first group is zero or a predetermined backup time corresponding to the life of a battery included in a CPE device in the first group of CPE devices in the absence of external power to the CPE device in the first group of CPE devices. In step 140 if the CPE device uptime did not exceed the duration of the network node power outage duration by expected CPE backup time, if any, then operation proceeds from step 140 to 142 in which the backup power controller increments a count of CPE devices which were unpowered while the network node was unpowered. Returning to step 140, in step 140 if the CPE device uptime exceeded the duration of the network node power outage by expected CPE backup time if any, then operation proceeds from step 140 to step 144 in which the backup power controller increments the count of CPE devices which had power while the network node was unpowered. Operation proceeds from step 144 to step 146. In step 146 the backup power controller stores information on the amount of time the CPE device was powered while the network node was unpowered.

Operation proceeds from step 142 or step 146 to the input of step 138 to process reported uptime information from another CPE. After each of the CPE devices, corresponding to a service group being processed, reporting uptime following the detected power outage for the network node have been processed, then operation proceeds from step 142 or 146 to step 148.

In step 148 the backup power controller compares the number of unpowered devices corresponding to the network node during the network node power outage to the number of powered CPE devices corresponding to the network node during the network node power outage. Operation proceeds from step 148 to step 150. In step 150, if at least a predetermined portion, i.e., 51% of reporting CPE devices, e.g., of the service group, remained powered during the network node power outage, then operation proceeds from step 150 to step 154 in which the backup power controller determines that CPE devices, e.g., in the service group being analyzed, correspond to a separate power region than the network node. However, if at least a predetermined portion, i.e., 51% of reporting CPE devices, e.g., of the service group, did not remain powered during the network node power outage, then operation proceeds from step 150 to step 152 in which the backup power controller determines that CPE devices, e.g., in the service group being analyzed, correspond to the same power region as the network node.

In some embodiments, the data analysis performed in step 136 includes using statistics to smooth and/or make determinations on the data collected. In some such embodiments, at least some data, e.g., timer counts, counts of affected CPE devices, etc., are subjected to processing, said processing including smoothing and/or performing statistical inferences. In some embodiments, step 136 includes analyzing data corresponding to a plurality of detected power outages detected at different times. For example, one iteration of step 136 may include using information corresponding to a currently detected network node power outage and information corresponding to prior detected power outages of the same network node. Different sets of CPE devices may be operating at different times a network node outage occurs, thus using data from multiple outages facilitates smoothing and is useful in generating a more accurate map. Operation proceeds from step 136, via connecting node C 156, to step 157.

In step 157 the backup power controller generates a power system and network node map indicating power system regions, network node regions, e.g., network node service group regions, and locations of network nodes, said power system and network node map providing a visual representation indicating whether a network node is in the same power grid region as a group of CPE devices serviced by the network node. In various embodiments, step 157 includes step 158. In step 158, the backup power controller generates, e.g., updates a power system/network node map to indicate whether a service region(s) of a network node, e.g., on a service group basis, corresponds to the same power supply region in which the network node is located or corresponds to a different power supply region as the power supply region in which the network node is located, e.g., based on data received and analyzed corresponding to the detected network node power outage.

In some embodiments, the generated power system and network node map may be, and sometimes is, based on analyzed data from a plurality of detected outages, e.g., corresponding to different times at which the same network node detected a power outage. In some embodiments, the generated power system and network node map of step 157 shows an average area, e.g., an average outage area, in one particular shade of a color and a potentially affected area as standard deviation from the mean, e.g., using different shades of the same color. In some embodiments, the generated power system and network node map uses different visual indications to indicate different types statistically based boundaries, e.g., a first color is used to indicate a boundary for an affected outage area corresponding to a network node based on an average, and a second color is used to indicate boundaries for the affected outage area corresponding to the network node based on a standard deviation from the mean. Operation proceeds from step 157 to step 159.

In step 159 the backup power controller performs at least one of: (i) communicates the generated map to a workstation or mobile communications device for display to a system manager or service technician, (ii) display the map on a display device, and/or (iii) prints the map on a printer. Operation proceeds from step 159 to step 160.

In step 160, if the network node and service region correspond to different power supply regions, then the backup power controller stores information, e.g., on a service group basis, on the number of CPE devices which remain powered on in the service region corresponding to the network node and average amount of time CPE devices were powered during outage. Operation proceeds from step 160 to step 162.

In step 162 the backup power controller determines frequency of power outages. This may be performed for one or more network nodes. Backup power resources may be, and sometimes are limited such that priority decisions are to be performed, e.g., on an ongoing basis as to how best deploy the limited backup power resources. Operation proceeds from step 162 to step 163.

In step 163 the backup power controller automatically controls the allocation of backup power to at least one network node in the network based on generated information indicating the relationship between power grid regions, the network node, e.g., the first network node, and CPE devices serviced by the network node, e.g., serviced by the first network node. In various embodiments, step 163 includes one or both of steps 164 and 165.

In step 164 the backup power controller automatically allocates and deploys backup power units to network nodes based on the number of CPE devices which remain powered on during a network node power outage and/or the average amount of time CPE devices in a network node service region remain powered while the network node is powered. For example, it is desirable to automatically deploy a backup power unit to a network node to support network node communications with one of its service regions which is located in a different power region than the power region in which the network node is located. It is also desirable to automatically deploy a backup power unit to a network node to support communications with a service region, which happens to be located in the same power region as the power region in which the network node is located when a large number of CPE devices in the service region include their own backup power supply.

In some embodiments at least one service region of a network node corresponds to two different power regions, a first portion of the service region corresponding to a first power region in which the network node is located and a second portion of the service region corresponding to a power region in which the network node is not located. In some such embodiments, it is desirable to automatically deploy backup power to support communications with the service region when a large number of CPEs of the service region are in a power region which is different from the power region in which the network node is located. In some embodiments, as a secondary consideration for backup power deployment, the backup power deployment decision is further based on the CPE backup power for CPEs in the same power region as the network node, e.g., the more CPEs in the same power region as the network node having backup power the more advantageous it is to deploy backup power at the network node for supporting communications with the service region when a power outage of the network node occurs.

In step 165 the backup power controller provides backup power to a network node, e.g., a first network node, for service to a service group in which a majority of CPE devices remained powered while power from an external power grid was lost to the network node, e.g., to the first network node. In some such embodiments, the step of providing backup power to the first network node for service to the service group in which a majority of CPE devices remained powered while power from an external power grid was lost is performed after a at power outage at said first network node and a determination based on information received from polling CPE devices serviced by said first network node. In some embodiments, the first network node provides service to multiple service groups and the service group to which backup power is automatically provided is a service group for which backup power was not previously provided while backup power was previously provided for service to another service group at said first network node.

Operation proceeds from step 163 to return step 166.

In various embodiments, multiple iterations of flowchart 100 are performed, e.g., with the network node and power system map being refined over time.

Figure 3:
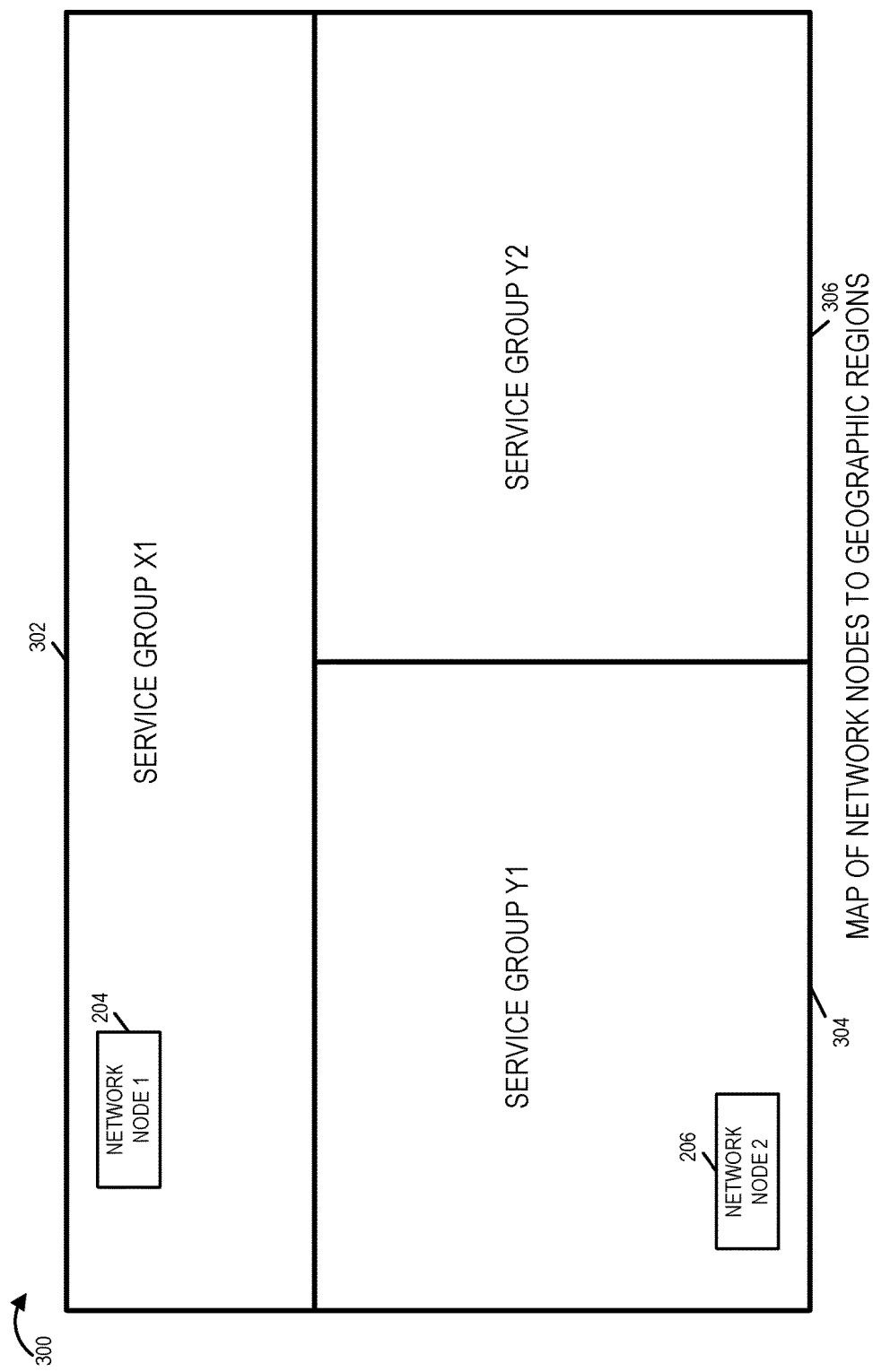
FIG. 3 is drawing of a map illustrating locations of exemplary network nodes and exemplary service group regions in which customer premises equipment (CPE) devices of the service group are located.

FIG. 3 is drawing 300 of a map illustrating locations of exemplary network nodes and exemplary service group regions in which CPE devices of the service group are located. Geographic region 302 is the region in which service group X1 210 CPE devices (CPE 1 258, ..., CPE N 260) are located. Network node 1 204 is located within geographic region 302 as shown. Geographic region 304 is the region in which service group Y1 212 CPE devices (CPE 1 262, ..., CPE M 264) are located. Network node 2 206 is located within geographic region 304 as shown. Geographic region 306 is the region in which service group Y2 214 CPE devices (CPE 1 266, ..., CPE Z 268) are located.

Figure 4:
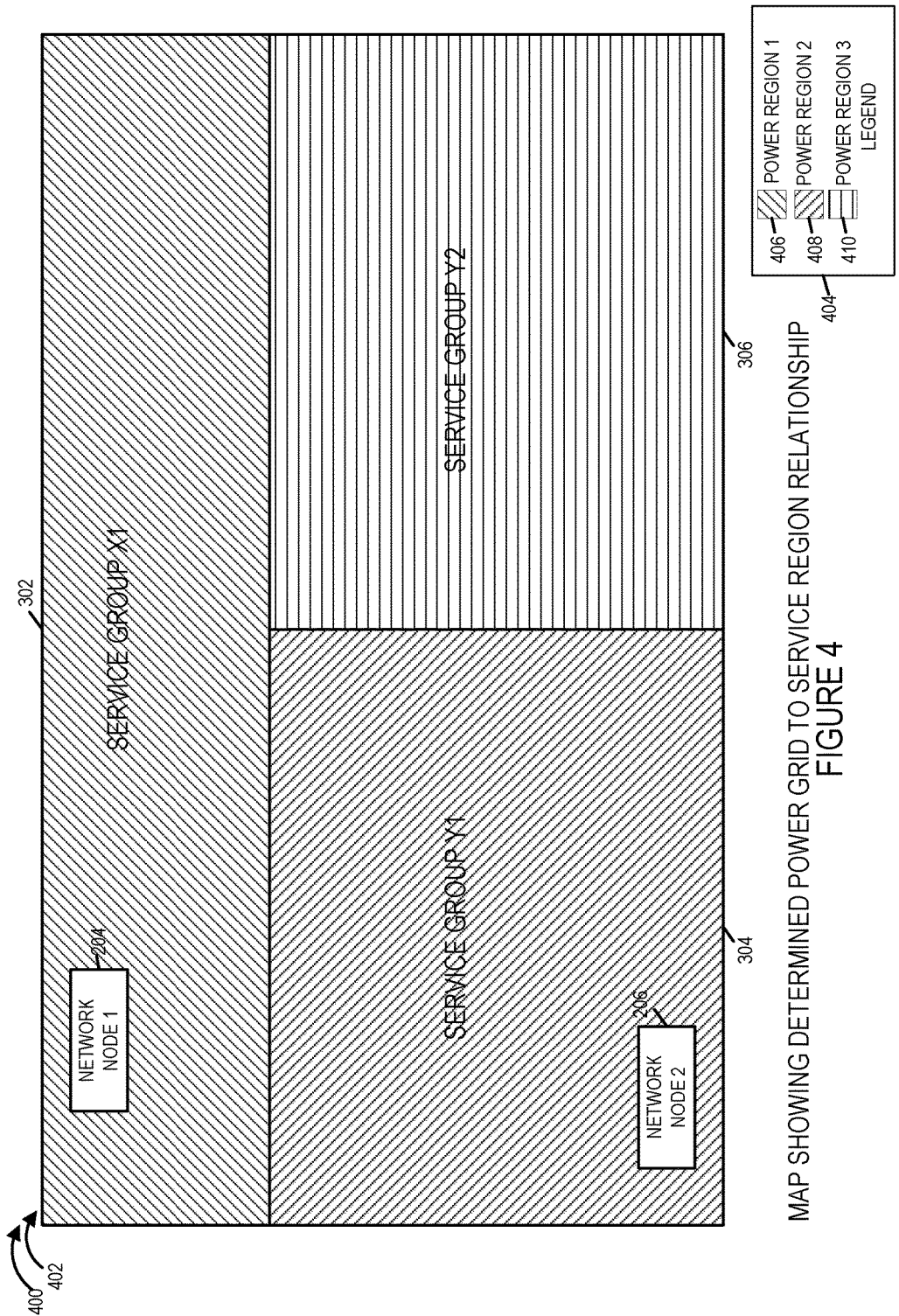
FIG. 4 illustrates a mapping of the network nodes and service group regions of FIG. 3 to exemplary power regions, e.g., based on data collected and analyzed during network node power failures.

FIG. 4 illustrates a mapping of the network nodes and service group regions of FIG. 3 to exemplary power regions, e.g., based on data collected and analyzed during network node power failures, e.g., at least one detected power outage of network node 1 204 and at least one detected power outage of network node 2 406. Drawing 400 of FIG. 4 includes a map 402 showing a backup power controller 219 determined power grid to service region relationship and a legend 404. Legend 404 includes legend element 406 which identifies power region 1 by left to right ascending line shading. Legend 404 includes legend element 408 which identifies power region 2 by left to right descending line shading. Legend 410 includes legend element 410 which identifies power region 3 by horizontal line shading. As may be observed network node 1 204 and the CPEs (CPE 1 258, ..., CPE N 260) of service group X1 210 are located within the same power region, power region 1. Network node 2 206 and the CPEs (CPE 1 262, ..., CPE M 264) of service group Y1 212 are located within the same power region, power region 2. The CPEs (CPE 1 266, ..., CPE Z 268) of service group Y2 214 are located in power region 3, which is a different power region than the power region in which network node 2 206 is located, which is power region 2.

Figure 5:
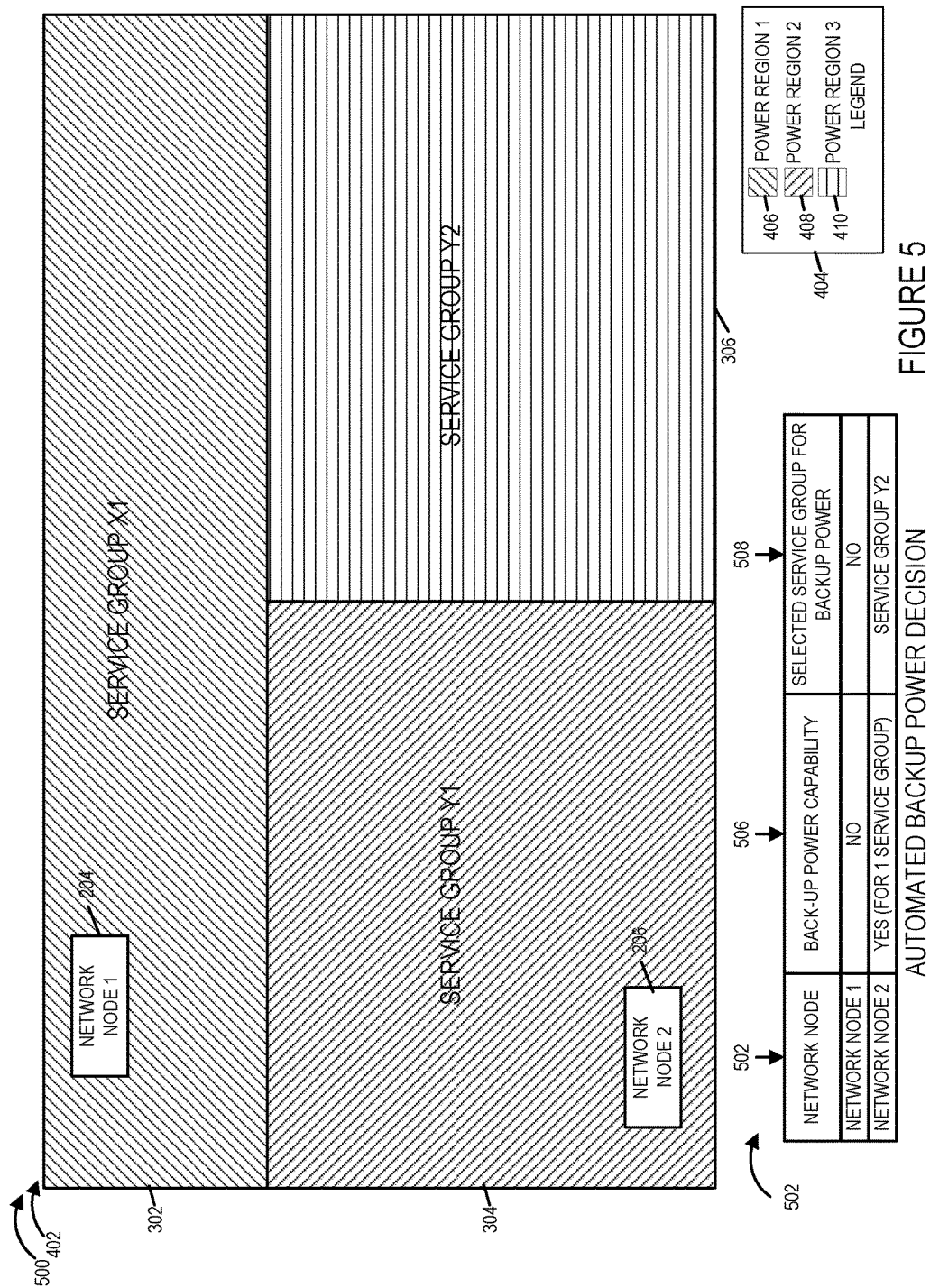
FIG. 5 illustrates an exemplary automated backup power decision, e.g., deployment of a backup power source to support network communications with CPE devices of a selected service group, based on the mapping of FIG. 4.

FIG. 5 illustrates an exemplary automated backup power decision, e.g., deployment of a backup power source to support network communications with CPE devices of a selected service group, based on the mapping of FIG. 4. Drawing 500 of FIG. 5 includes power map 402 and grid 404 of FIG. 4 and further includes automated backup power decision table 502. The decision of table 502 is performed by backup power controller 219, e.g., in accordance with the method of flowchart 100 of FIG. 1. First column 502 identifies network node, second column 506 identifies back-up power capability, and third column 508 identifies selected service group for back-up power deployment.

Table 502 indicates that network node 1 204 does not originally include back-up power capability and a service group is not selected for backup power to be deployed. In this example, consider that based on collected data and analysis none or only a very small percentage of the CPEs (258, ..., 260) in service group X1 210 have backup power, and since both network node 1 204 and the CPEs (258, ..., 260) of service group X1 210 are located in the same power region, power region 1, there is no point of powering on network node 1 204 during a power loss interval in which all or the vast majority of CPEs (258, ..., 260) will be without power.

Table 502 further indicates that network node 2 206 includes back-up power capability for supporting one service group and that service group Y2 214 communications capability is selected for backup power, e.g., to be supplied by backup power unit 248. In this example, consider that based on collected data and analysis none or only a very small percentage of the CPEs (262, ..., 264) in service group Y1 212 have backup power, and since both network node 2 206 and the CPEs (252, ..., 264) of service group Y1 210 are located in the same power region, power region 2, there is no point of powering on network node 2 206 for supporting service group Y1 212 communications during a power loss interval in which all or the vast majority of CPEs (262, ..., 264) will be without power. However, in this example, based on the power map 402, network node 2 206 is in a different power region than the CPEs(266, ..., 268) of service group Y2 214, power region 2 vs. power region 3. Therefore, when power region 2 including network node 2 206 is experiencing a power outage, CPEs (266, ..., 268) of service group Y2 214 will not necessarily experience a power outage; therefore, it is beneficial for the backup power source 248 to power up circuitry including RX 254 and TX 256 for supporting communications between network node 2 206 and CPEs (266, ..., 268) of service group Y2 214, when a power outage of network node 2 206 occurs.

Figure 6:
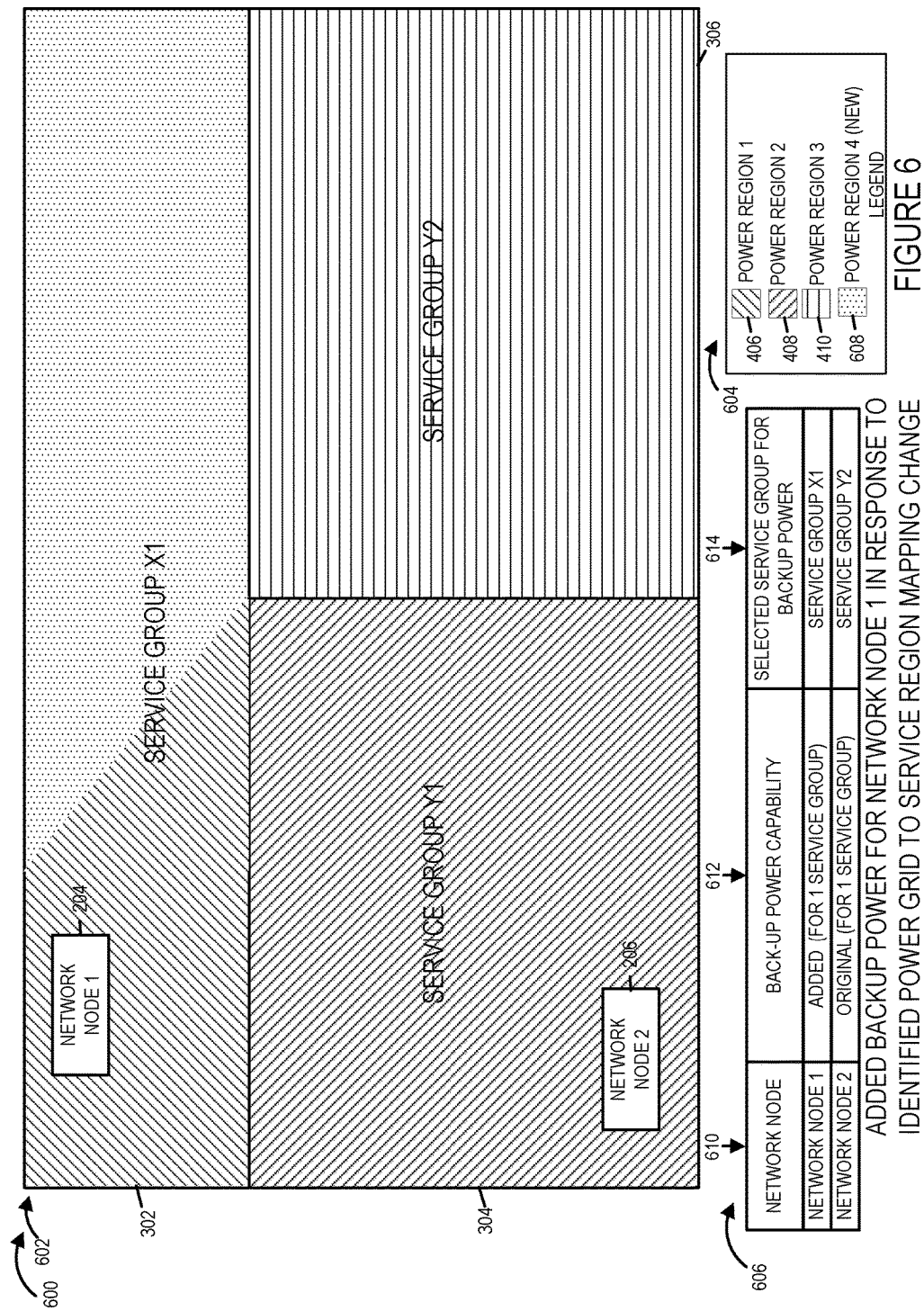
FIG. 6 illustrates an example of detected change in the service group to power region mapping of FIG. 4, and exemplary automated added backup power in response to the detected change.

FIG. 6 illustrates an example of detected change in the service group to power region mapping of FIG. 4, and exemplary automated added backup power in response to the detected change. Consider that the power company makes a change to power infrastructure resulting in different power regions from the scenario indicated in FIG. 4; the communications system 100 may be initially unaware of the power system company infrastructure change. Based on data collected and processed corresponding to a network node 1 204 power outage, updated map 602 is generated from the previous map of FIG. 4.

Drawing 600 of FIG. 6 includes a power region to network node and service group mapping map 602, a legend 604 and a table 606 indicating a backup power deployment in response to the identified power region change. Legend 604 includes legend element 406 which identifies power region 1 by left to right ascending line shading. Legend 604 includes legend element 408 which identifies power region 2 by left to right descending line shading. Legend 604 includes legend element 410 which identifies power region 3 by horizontal line shading. Legend 604 includes legend element 608 which identifies power region 4, which is a new power region, by dot line shading.

As may be observed network node 1 204 and a first portion of the CPEs (CPE 1 258, ..., CPE N 260) of service group X1 210 are located within the same power region, power region 1; and a second portion of the CPEs (CPE 1 258, . . . , CPE N 260) of service group X1 210 are located in power region 4. Consider that the CPEs (CPE 1 258, . . . , CPE N 260, are relatively uniformly spaced throughout geographic region 302 in which service group 1 CPEs are located. For example, data collected and analyzed by backup power controller 219 corresponding to a power outage of network node 1 204, indicated that the majority of CPEs (CPE 1 258, . . . , CPE N 260) did not experience a power outage when network node 1 experienced a power outage, e.g., based on uptime information from CPEs in service group X1 210. This information may be used in generating map 602.

Network node 2 206 and the CPEs (CPE 1 262, . . . , CPE M 264) of service group Y1 212 are located within the same power region, power region 2. The CPEs (CPE 1 266, . . . , CPE Z 268) of service group Y2 214 are located in power region 3, which is a different power region than the power region in which network node 2 206 is located, which is power region 2.

First column 610 of table 606 indicates the network node; the second column 612 of table 612 indicates the back-up power capability, and third column 614 indicates the selected service group for backup power. In this example, the backup power controller 219 determines and commands that backup power be added into network node 1 204 for supporting communications with service group X1 210. Based on the new power mapping, the majority of CPE (258, . . . , 260) of service group X1 210 are now located in a different power region that the location of network node 1 204. Therefore, it now make sense to deploy a backup power unit, e.g., backup power unit 208, in network node 1 204, which is located in power region 1, to support communication with the CPEs of service group X1 210, which happen to be located in power region 4. With the power mapping of map 602, when the primary power to network node 1 204 fails, it is advantageous and beneficial to have backup power available since the majority of CPEs in service group X1 210 will not necessarily lose power at that time since they are in a different power region (power region 4) than the power region (power region 1) of network node 1 204. In some embodiments, the deployable additional backup power unit 208 is deployed to network node 1 204 in response to a deployment command message from power controller 219 to deployment center server 209.

Network node 2 206 maintains the original back-up power configuration of FIG. 5, with backup power unit 248 supporting communications with service group Y2 214, since the power region mapping has not changed with respect to network node 2 206, service group Y1 212 and service group Y2 214.

Figure 7:
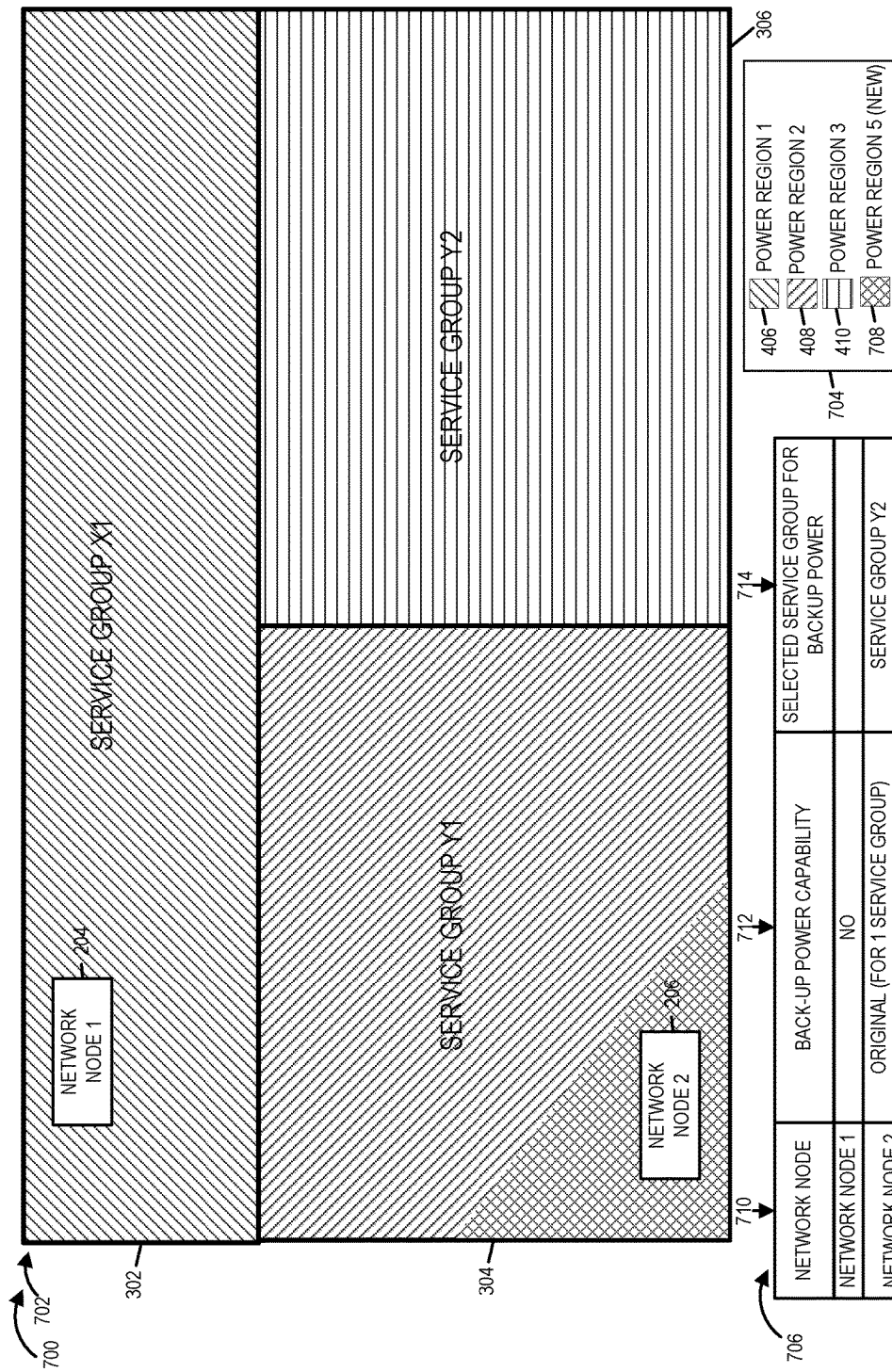
FIG. 7 illustrates another example of detected change in the service group to power region mapping of FIG. 4, and exemplary automated added backup power in response to the detected change.

FIG. 7 illustrates another example of detected change in the service group to power region mapping of FIG. 4, and exemplary automated added backup power in response to the detected change. Consider that the power company makes a change to power infrastructure resulting in different power regions from the scenario indicated in FIG. 4; the communications system 100 may be initially unaware of the power system company infrastructure change. Based on data collected and processed corresponding to a network node 2 206 power outage, updated map 702 is generated from the previous map of FIG. 4.

Drawing 700 of FIG. 7 includes a power region to network node and service group mapping map 702, a legend 704 and a table 706 indicating a backup power deployment in response to the identified power region change. Legend 704 includes legend element 406 which identifies power region 1 by left to right ascending line shading. Legend 704 includes legend element 408 which identifies power region 2 by left to right descending line shading. Legend 704 includes legend element 410 which identifies power region 3 by horizontal line shading. Legend 704 includes legend element 708 which identifies power region 5, which is a new power region, by cross-hatch line shading.

As may be observed network node 2 206 and a first portion of the CPEs (CPE 1 262, . . . , CPE M 264) of service group Y1 212 are located within the same power region, power region 5; and a second portion of the CPEs (CPE 1 262, . . . , CPE M 264) of service group Y1 212 are located in power region 2. Consider that the CPEs (CPE 1 262, . . . , CPE M 264), are relatively uniformly spaced throughout geographic region 304 in which service group Y1 CPEs are located. For example, data collected and analyzed by backup power controller 219 corresponding to a power outage of network node 2 206, indicated that the majority of CPEs (CPE 1 262, . . . , CPE N 262) of service group Y1 212 did not experience a power outage when network node 2 206 experienced a power outage, e.g., based on uptime information from CPEs in service group Y1 212. This information may be used in generating map 702.

The CPEs (CPE 1 266, . . . , CPE Z 268) of service group Y2 214 are located in power region 3, which is a different power region than the power region in which network node 2 206 is located, which is now power region 5.

The CPEs (CPE 1 258, . . . , CPE N 260) of service group Y1 210 are located in power region 1, which is the same power region as the power region in which network node 1 204 is located; this is the same situation as in FIG. 4, and no change is implemented with regard to backup power with respect to network node 1 204 for the same reason described with respect to FIG. 5.

First column 710 of table 706 indicates the network node; the second column 712 of table 706 indicates the back-up power capability, and third column 714 indicates the selected service group for backup power. In this example, the backup power controller 219 determines and commands that backup power be added into network node 2 206 for supporting communications with service group Y1 212. Based on the new power mapping, the majority of CPE (262, . . . , 264) of service group Y1 212 are now located in a different power region (power region 2) than the power region (power region 5) corresponding to the location of network node 2 206. Therefore, it now make sense to deploy a backup power unit, e.g., backup power unit 208, in network node 2 206, which is located in power region 5, to support communication with the CPEs of service group Y1 212, which happen to be located in power region 2. With the power mapping of map 702, when the primary power to network node 2 206 fails, it is advantageous and beneficial to have backup power available since the majority of CPEs in service group Y1 212 will not necessarily lose power at that time since they are in a different power region (power region 2) than the power region (power region 5) of network node 2 206. In some embodiments, the deployable additional backup power unit 208 is deployed to network node 2 206 in response to a deployment command message from power controller 219 to deployment center server 209.

Network node 2 206 maintains the original back-up power configuration of FIG. 5, with backup power unit 248 supporting communications with service group Y2 214, since network node 2 206 is still located in a different power region (power region 5) than the power region (power region 3) in which the CPEs (266, . . . , 268) of service group Y2 214 are located.

Figure 8:
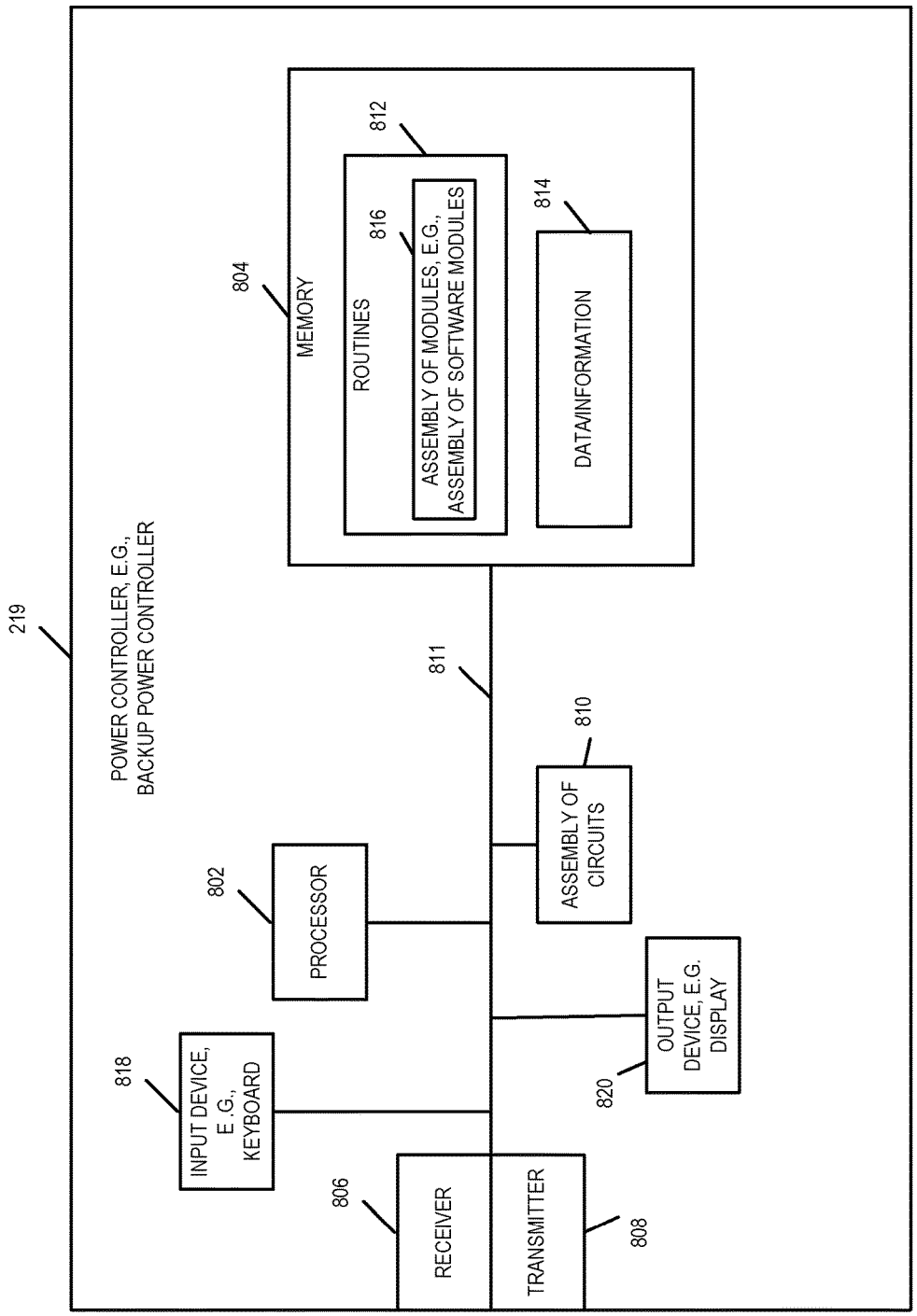
FIG. 8 is a drawing of an exemplary power controller, e.g., a backup power controller, in accordance with an exemplary embodiment.

FIG. 8 is a drawing of an exemplary power controller 219, e.g., a backup power controller, in accordance with an exemplary embodiment. Exemplary power controller 219 includes a processor 802, e.g., a CPU, a memory 804, a receiver 806, a transmitter 808, an assembly of circuits 810, an input device 818, e.g., a keyboard, keypad, mouse, touch-screen, etc., and an output device 820, e.g., display, coupled together via a bus 811 over which the various elements may interchange data and information. Memory 804 includes routines 812 and data/information 814. Routine 812 includes an assembly of modules, e.g., an assembly of software modules 816.

Figures 9, 9C:
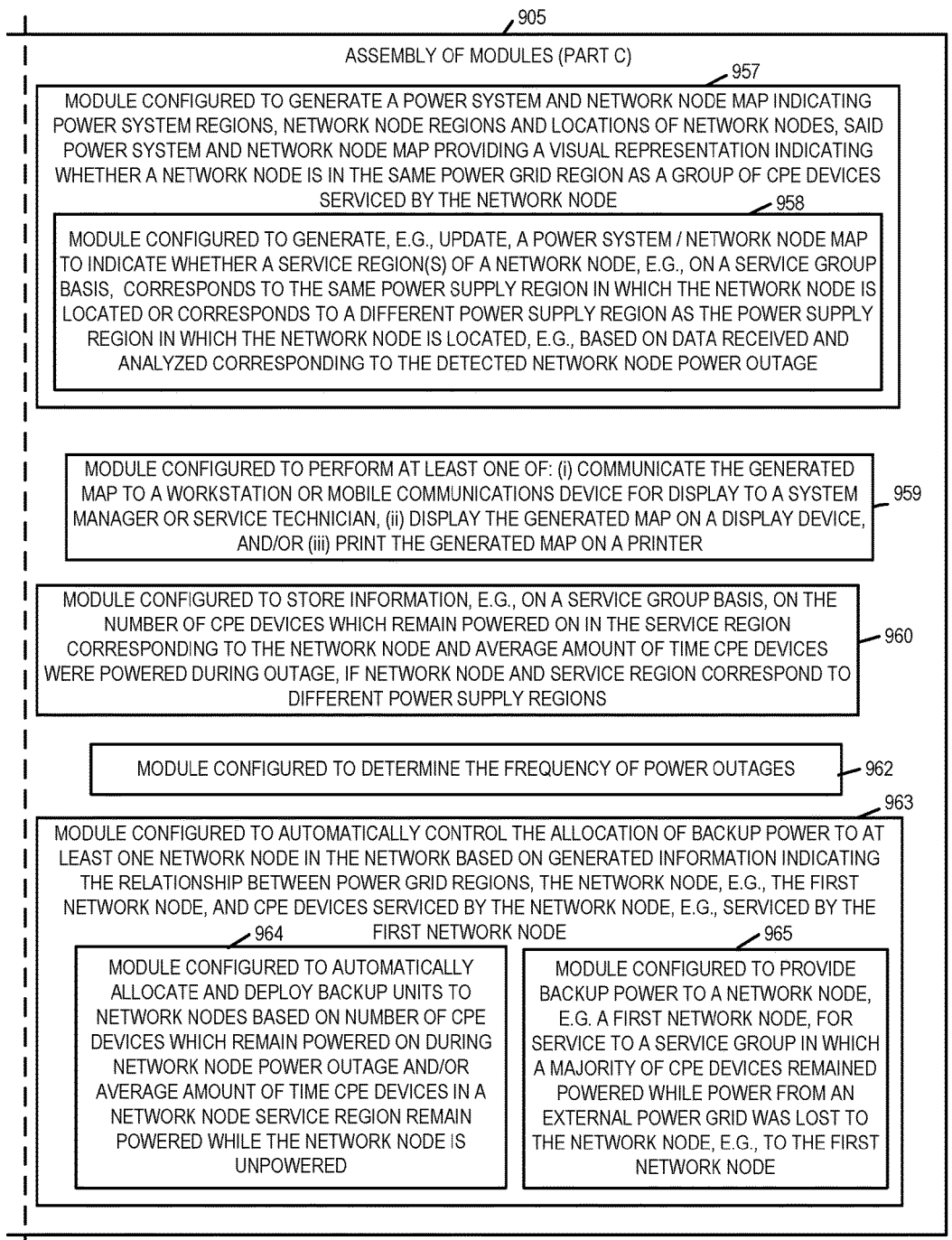
FIG. 9C is a drawing of a third part of assembly of modules which may be included in the power controller of FIG. 8.
FIG. 9 comprises the combination of FIG. 9A, FIG. 9B and FIG. 9C.
Figure 9A:
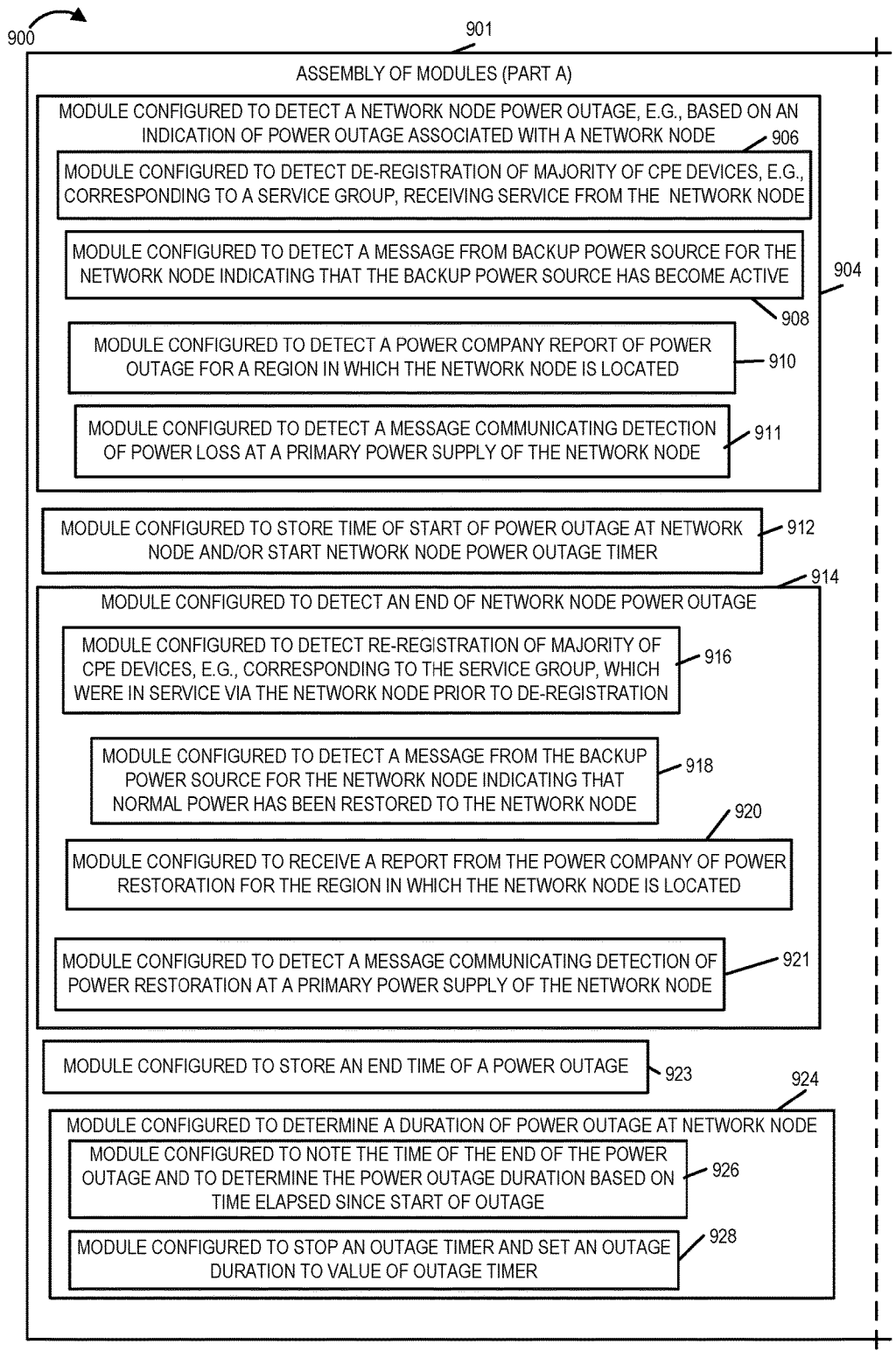
FIG. 9A is a drawing of a first part of assembly of modules which may be included in the power controller of FIG. 8.
Figure 9B:
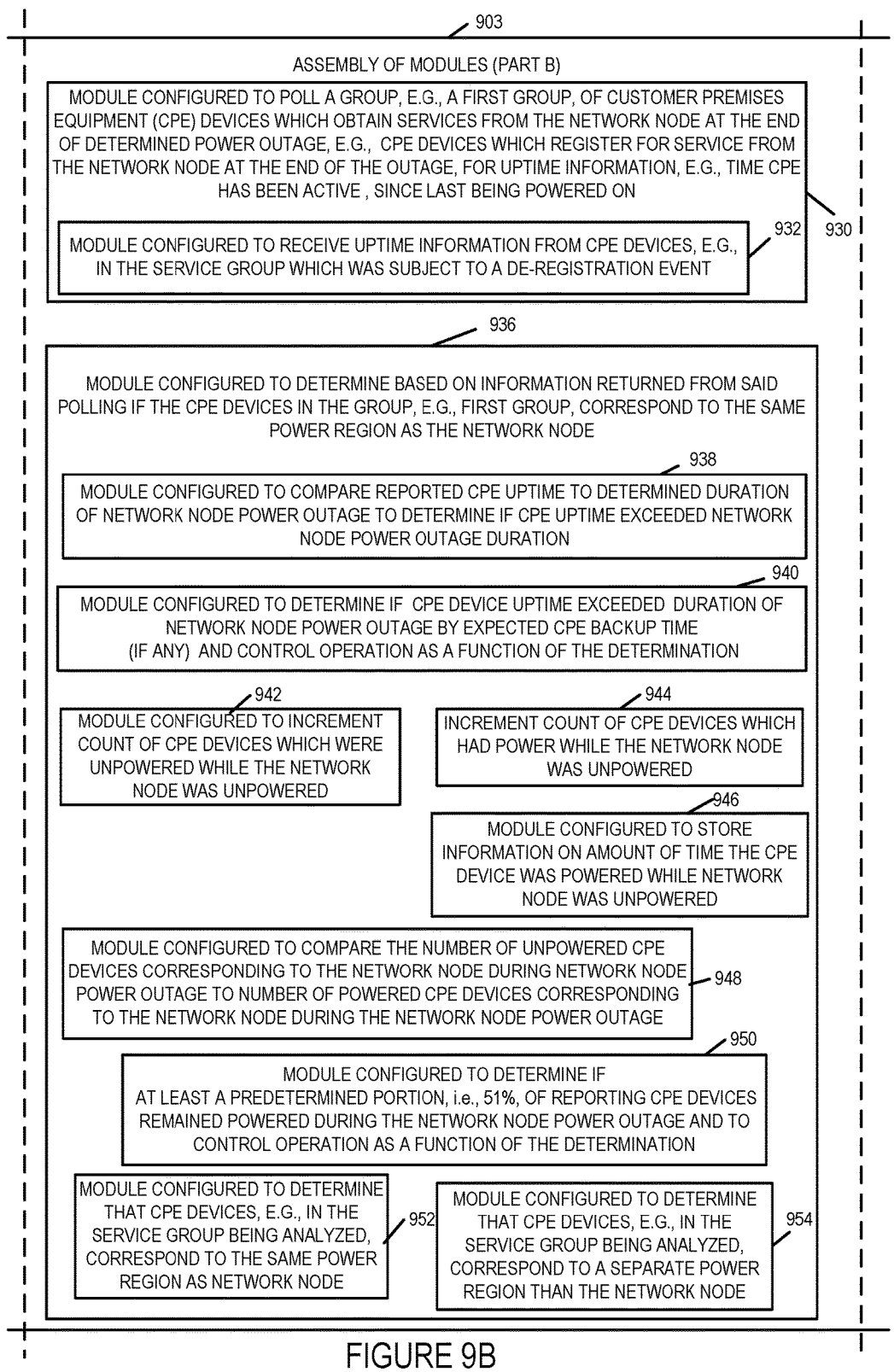
FIG. 9B is a drawing of a second part of assembly of modules which may be included in the power controller of FIG. 8.

FIG. 9, comprising the combination of FIG. 9A, FIG. 9B and FIG. 9C, is a drawing of an assembly of modules 900, comprising the combination of Part A 901, Part B 903 and Part 3 905, which may be included in an exemplary power controller, e.g., power controller 219 of FIG. 1 and FIG. 8, in accordance with an exemplary embodiment. Assembly of modules 900 can, and in some embodiments is, used in the power controller 219. The modules in the assembly of modules 900 can, and in some embodiments are, implemented fully in hardware within the processor 802, e.g., as individual circuits. The modules in the assembly of modules 900 can, and in some embodiments are, implemented fully in hardware within the assembly of circuits 810, e.g., as individual circuits corresponding to the different modules. In other embodiments some of the modules are implemented, e.g., as circuits, within the processor 802 with other modules being implemented, e.g., as circuits within assembly of circuits 810, external to and coupled to the processor 802. As should be appreciated the level of integration of modules in the processor and/or with some modules being external to the processor may be one of design choice. Alternatively, rather than being implemented as circuits, all or some of the modules may be implemented in software and stored in the memory 804 of the power controller 219, with the modules controlling operation of power controller 219 to implement the functions corresponding to the modules when the modules are executed by a processor, e.g., processor 802. In some such embodiments, the assembly of modules 900 is included in the memory 804 as assembly of modules 816. In still other embodiments, various modules in assembly of modules 900 are implemented as a combination of hardware and software, e.g., with another circuit external to the processor providing input to the processor 802 which then under software control operates to perform a portion of a module's function. While shown in the FIG. 8 embodiment as a single processor, e.g., computer, it should be appreciated that the processor 802 may be implemented as one or more processors, e.g., computers.

When implemented in software the modules include code, which when executed by the processor 802, configure the processor 802 to implement the function corresponding to the module. In embodiments where the assembly of modules 900 is stored in the memory 804, the memory 804 is a computer program product comprising a computer readable medium comprising code, e.g., individual code for each module, for causing at least one computer, e.g., processor 802, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 9 control and/or configure the power controller 219 or elements therein such as the processor 802, to perform the functions of corresponding steps illustrated in the method of flowchart 100 of FIG. 2 and/or described with respect to any of the Figures. Thus the assembly of modules 900 includes various modules that perform functions of corresponding steps of one or more of FIGS. 2.

Assembly of modules 900 includes a module 904 configured to detect a network node power outage, e.g., based on an indication of a power outage associated with a network node. Module 904 includes a module 906 configured to detect de-registration of a majority of CPE devices, e.g., corresponding to a service group, receiving service from the network node, a module 908 configured to detect a message from a backup power source for the network node indicating that the backup power source has become active, a module 910 configured to detect a power company report of power outage for a region in which the network node is located, and a module 911 configured to detect a message communicating detection of power loss at a primary power supply of the network node.

Assembly of modules 900 further includes a module 912 configured to store a start time of the start of a power outage at a network node and/or start a network node power outage timer, module 914 configured to detect an end of a network node power outage. Module 914 includes a module 916 configured to detect re-registration of a majority of CPE devices, e.g., corresponding to the servie group, which were in service via the network node prior to de-registration, a module 918 configured to detect a message from the backup power source for the network node indicating that normal power has been restored to the network node, a module 920 configured to receive a report from the power company indicating that normal power has been restored to the network node, and a module 921 configured to detect a message communicating detection of power restoration at a primary power supply of the network node.

Assembly of modules further includes a module 923 configured to store an end time of a power outage, and a module 924 configured to determine a duration of a power outage at a network node. Module 924 includes a module 926 configured to note the time of the end of the power outage and determine the duration based on the elapsed time since the start of the power outage, and a module 929 configured to stop an outage timer and set an outage duration to the value of the outage timer.

Assembly of modules 900 further includes a module 930 configured to poll a group, e.g., a first group, of customer premises equipment (CPE) devices which obtain services from the network node at the end of the determined power outage, e.g., CPE devices which register for service from the network node at the end of the outage, for uptime information, e.g., time the CPE has been active since last being powered on. Module 930 includes a module 932 configured to receive uptime information form CPE devices, e.g., CPE devices in the servie group which was subject to a de-registration event.

Assembly of modules 900 further includes a module 936 configured to determine based on information returned form said polling if the CPE devices in the group, e.g., the first group, correspond to the same power region as the network node. Module 936 includes a module 938 configured to compare reported CPE uptime to determined duration of network node power outage to determine if CPE uptime exceeded network node power outage duration, a module 940 configured to determine if a CPE device uptime exceeded duration of the network node power outage by expected CPE backup time, if any, and to control operation as a function of the determination, a module 942 configured to increment the count of CPE devices which were unpowered while the network node was unpowered, a module 944 configured to increment a count of CPE device which had power while the network node was unpowered, a module 946 configured to store information on the time the CPE device was powered while the network node was unpowered, and a module 948 configured to compare the determined number of unpowered CPE devices corresponding to the network node power outage to the determined number of powered CPE devices corresponding to the network node during the network node power outage. Module 936 further includes a module 950 configured to determine if at least a predetermined portion, e.g., 51%, of reporting CPE devices remained powered during the network node power outage and to control operation as a function of the determination, a module 952 configured to determine that CPE devices, e.g., in the service group being analyzed correspond to the same power region as the network node which experienced the power outage, and a module 954 configured to determine that CPE devices, e.g., in the service group being analyzed, correspond to a separate power region than the power region in which the network node, which experience the power outage, is located.

Assembly of modules 900 further includes a module 957 configured to generate a power system and network node map indicating power system regions, network node regions, e.g., network node service group regions, and locations of network nodes, said power system and network node map providing a visual representation indicating whether a network node is in the same power grid region as a group of CPE devices serviced by the network node. Module 957 includes a module 958 configured to generate, e.g., update, a power system/network node map to indicate where a service region(s) of a network node, e.g., on a service group basis, corresponds to the same power supply region in which the network node is located or corresponds to a different power supply region as the power supply region in which the network node is located, e.g., based on data received and analyzed corresponding to the detected network node power outage.

Assembly of modules 900 further includes a module 959 configured to perform at least one of: (i) communicated the generated map to a workstation or mobile communication device for display to a system manager or service technician; (ii) display the generated map on a display device; and/or (iii) print the generated map on a printer, a module 960 configured to store information, e.g., on a service group basis, on the number of CPE devices which remain powered on in the service region corresponding to the network node and average amount of time CPE devices were powered on during the outage, if the network node and service region correspond to different power supply regions, and am module 962 configured to determine the frequency of power outages, e.g., for different power group regions, for different network node, and for different service group regions of a network node, etc.

Assembly of modules 900 further includes a module 963 configured to automatically control the allocation of backup power to at least one network node in the network based on generated information indicating the relationship between power grid regions, the network node, e.g., the first network node, and CPE devices serviced by the network node, e.g., serviced by the first network node. Module 963 includes a module 964 configured to automatically allocate and deploy backup power units to network nodes based on the number of CPE devices which remained powered on during a detected network node power outage and/or an average amount of time CPE devices in a network node service region remain powered while the network node is unpowered, and a module 965 configured to provide backup power to a network node, e.g., a first network node, for service to a service group in which a majority of CPE devices remained powered while power from an external power grid was lost to the network node, e.g., to the first network node.

Various embodiments have been discussed above. It should be appreciated that the invention is not intended to be limited by the exemplary embodiments which are to facilitate an understanding of the invention and its many possible applications.

In various embodiments system elements described herein are implemented using one or more modules which are used to perform the steps corresponding to one or more methods of the present invention, for example, receiving control signal, e.g., pause signal, from a first device, initiating recording of a paused program and providing the recorded portion of the paused program to a second device. In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of operating a device in a communications network including a first network node, the method comprising:
    detecting, at said device, a network node power outage at the first network node;
    detecting, at said device, an end of said network node power outage at the first network node;
    determining a duration of the detected power outage at the first network node;
    polling a first group of customer premises equipment (CPE) devices which obtain service from the first network node at the end of the detected power outage;
    determining based on information returned from said polling if the CPE devices in the first group correspond to the same power region as the first network node;
    determining if CPE device uptime time exceeds the duration of the detected power outage at the first network node by an amount which exceeds an expected backup time for the CPE devices in the first group of CPE devices; and automatically controlling the allocation of backup power to at least one network node in the communications network based on the determination of whether the CPE devices in the first group correspond to the same power region as the first network node.

2. The method of claim 1, further comprising:
storing a start time indicating the start of the network node power outage at the first network node.

3. The method of claim 2, wherein said polling the first group of customer premise (CPE) devices includes:
polling the first group of CPE devices for uptime information; and
wherein said information returned from said polling includes information indicating how long individual devices in said first group have remained powered on.

4. The method of claim 1 wherein the expected backup time for CPE devices in the first group is zero or a predetermined backup time corresponding to the expected life of a battery included in a CPE device in the first group of CPE devices in the absence of external power to the CPE device in the first group of CPE devices.

5. The method of claim 1, further comprising:
generating a power system and network node map indicating power system regions, network node regions and locations of network nodes, said power system and network node map providing a visual indication indicating whether a network node is in the same power grid region as a group of CPE devices serviced by the network node.

6. The method of claim 5, further comprising:
performing at least one of:
(i) communicating the generated map to a workstation or mobile communications device for display to a system manager or service technician,
(ii) displaying the generated map on a display device or
(iii) printing the generated map on a printer.

7. The method of claim 5,
wherein said step of automatically controlling the allocation of backup power to at least one network node in the communications network is further based on generated information indicating the relationship between power grid regions, the first network node and CPE devices serviced by the first network node.

8. The method of claim 7, wherein automatically controlling the allocation of backup power to at least one network node includes providing backup power to said first network node for service to a service group in which a majority of CPE devices remained powered while power from an external power grid was lost to the first network node.

9. The method of claim 8, wherein said step of providing backup power to the first network node for service to the service group in which the majority of CPE devices remained powered while power from an external power grid was lost is performed after a power outage at said first network node and a determination based on information received from polling CPE devices serviced by said first network node that the first network node was unpowered while a majority of CPE devices in said service group were powered.

10. The method of claim 9, wherein said first network node provides service to multiple service groups and wherein said service group to which backup power is automatically provided is a service group for which backup power was not previously provided while backup power was provided to another service group at said first network node.

11. The method of claim 1, wherein detecting a network node power outage includes:

detecting a de-registration event involving deregistration of a majority of CPE devices in a service group serviced by the first network node;
detecting a message from a backup power source for the first network node indicating that the backup power source has become active; or
detecting a power company report of a power outage for a region in which the first network node is located.

12. The method of claim 11, wherein detecting an end of a network node power outage includes:
detecting a re-registration of the majority of CPE in the service group serviced by the first network node;
detecting a message from the backup power source for the first network node indicating that normal power has been restored to the first network node; or
receiving a report from the power company of power restoration for the region in which the first network node is located.

13. A device in a communications network including a first network node, the device comprising:
a processor configured to:
detect a network node power outage at the first network node;
detect an end of a network node power outage at the first network node;
determine a duration of the detected power outage at the first network node;
poll a first group of customer premises equipment (CPE) devices which obtain service from the first network node at the end of the detected power outage;
determine based on information returned from said polling if the CPE devices in the first group correspond to the same power region as the first network node;
determine if CPE device uptime time exceeds the duration of the detected power outage at the first network node by an amount which exceeds an expected backup time for the CPE devices in the first group of CPE devices; and
automatically control the allocation of backup power to at least one network node in the communications network based on the determination of whether the CPE devices in the first group correspond to the same power region as the first network node.

14. The device of claim 13, further comprising:
memory for storing a start time indicating the start of the network node power outage at the first network node.

15. The device of claim 14, wherein said processor is configured to:
poll the first group of CPE devices for uptime information as part of being configured to poll the first group of customer premise devices; and
wherein said information returned from said polling includes information indicating how long individual devices in said first group have remained powered on.

16. The device of claim 15, wherein said processor is configured to:
determine if CPE device uptime time exceeds the duration of the power outage at the first network node by an amount which exceeds an expected backup time for the CPE devices in the first group of CPE devices, as part of being configured to determine based on the information returned from said polling if the CPE devices in the first group correspond to the same power region as the first network node.

17. The device of claim 16 wherein the expected backup time for CPE devices in the first group is zero or a predetermined backup time corresponding to the expected life of a battery included in a CPE device in the first group of CPE devices in the absence of external power to the CPE device in the first group of CPE devices.

18. The device of claim 13, wherein said processor is further configured to:
   generate a power system and network node map indicating power system regions, network node regions and locations of network nodes, said power system and network node map providing a visual indication indicating whether a network node is in the same power grid region as a group of CPE devices serviced by the network node.

19. The device of claim 18, wherein said processor is further configured to perform at least one of:
   (i) control a transmitter of the device to communicate the generated map to a workstation or mobile communications device for display to a system manager or service technician,
   (ii) display the generated map on a display device or
   (iii) control the transmitter to output the generated map for printing the generated map on a printer.

* * * * *